(12) United States Patent
Andoh

(10) Patent No.: US 6,351,441 B1
(45) Date of Patent: Feb. 26, 2002

(54) REGULATABLE OPTICAL DISC DRIVE AND METHOD OF CONTROLLING A REGULATABLE OPTICAL DISC DRIVE

(76) Inventor: Junichi Andoh, c/o Mitsumi Electric Co., Ltd. of 8-8-2, Kokuryo-cho, Chofu-shi, Tokyo (JP)

( * ) Notice: Subject to any disclaimer, the term of this patent is extended or adjusted under 35 U.S.C. 154(b) by 0 days.

(21) Appl. No.: 09/317,275

(22) Filed: May 24, 1999

(51) Int. Cl.[7] .............................................. G11B 7/00
(52) U.S. Cl. ................................. 369/53.3; 369/53.37
(58) Field of Search ........................... 369/47.38, 47.39, 369/47.42, 53.43, 53.3, 53.37, 44.27, 44.29, 44.32, 44.35, 44.36, 47.45, 124.15, 53.45

(56) References Cited

U.S. PATENT DOCUMENTS 5,612,933 A    3/1997  Iso et al.
5,844,872 A   12/1998  Kubo et al.

FOREIGN PATENT DOCUMENTS

EP          0821356 A2    1/1998

*Primary Examiner*—Paul W. Huber
(74) *Attorney, Agent, or Firm*—Patents + TMS

(57) ABSTRACT

An optical disc drive for playing back or recording and playing back an optical disc comprises a motor for rotating an optical disc, an optical pick-up having an objective lens which is actuated by servo operation, and a CPU for controlling the motor and the optical pick-up. The CPU is constructed to control the motor and the optical pick-up so that, when the rotation number of the optical disc is to be increased to a first target rotation number, the rotation number of the optical disc is provisionally set to a second target rotation number which is smaller than the first target rotation number, and the servo operation of the optical pick-up is caused to engage until the rotation number of the optical disc reaches the second target rotation number.

16 Claims, 17 Drawing Sheets

FIG. 8

FRAME FORMAT OF 1 ATIP FRAME (42Bits 1/75sec)

| NUMBER OF BITS | 4 | 8 | 8 | 8 | 14 |
|---|---|---|---|---|---|
| BIT POSITION | 1234 | 111<br>56789012 | 11111112<br>34567890 | 22222222<br>12345678 | 23333333333444<br>90123456789012 |
| DATA | Sync | Min | Sec | Frame | Error Detection Code |

FIG. 14

| Q DATA 96Bits FORMAT | | | |
|---|---|---|---|
| Q1~Q4 | Q5~Q8 | Q9............Q80 | Q81.........Q96 |
| CONTROL | ADDRESS | DATA 72Bits | CRC 16Bits |

FIG. 16  ROUTINE FOR ROTATION NUMBER CONTROL WHEN SERVO CONTROLS ARE STARTED

REGULATABLE OPTICAL DISC DRIVE AND METHOD OF CONTROLLING A REGULATABLE OPTICAL DISC DRIVE

BACKGROUND OF THE INVENTION

1. Field of the Invention

This invention relates to an optical disc drive for playing back or recording and playing back an optical disc and a method of controlling the optical disc drive.

2. Description of the Prior Art

There are known optical disc drives for playing back (reproducing) or recording and playing back an optical disc such as a CD (compact disc), CD-ROM, CD-R (CD-Recordable) and CD-RW (CD-Rewritable).

In the conventional optical disc drives, when the disc drive is to be operated once after the rotation of the optical disc has been stopped, various servo controls such as a focus servo, a tracking servo and a sled servo must be carried out in the process of accelerating the rotational speed of the optical disc so that its rotation number becomes the same as that of the previous operation. Further, in recent years, the rotation speed (data transmission speed) of the optical disc tends to increase to a multiple times rotation speed (for example, from 2x to 4x, 6x, 8x, 12x, 16x, 24x, 32x and the like).

Meanwhile, in the commercially available optical discs, there is a case that poor eccentric optical discs (optical discs having unbalanced weight distribution) are included therein. When the rotation speed of such an eccentric optical disc is to be accelerated in order to rotate the optical disc at a high speed, larger vibration is likely to occur as compared with the case where a normal optical disc is rotated at a high speed. When such large vibration of the optical disc drive is transmitted to an optical pick-up, it gives rise to a problem in that various servo controls such as a focusing servo and a tracking servo are not engaged properly.

SUMMARY OF THE INVENTION

In view of the problem as described above, the object of the present invention is to provide an optical disc drive which can perform various servo controls properly even when the rotational speed of the optical disc is accelerated to a high rotation speed once after the rotation of the optical disc has been stopped.

In order to achieve the object, the present invention is directed to an optical disc drive for playing back or recording and playing back an optical disc. The disc drive comprises an optical disc driving mechanism for rotating an optical disc; an optical pick-up having an objective lens which is actuated by servo operation; signal processing means for processing signals read out from the optical disc through the optical pick-up; and control means for controlling the optical disc rotating mechanism, the optical pick-up and the signal processing means. The controlling means includes initial control means for controlling the optical pick-up rotating mechanism and the optical pick-up so that, when the rotation number of the optical disc is to be increased to a first target rotation number, the rotation number of the optical disc is provisionally set to a second target rotation number which is smaller than the first target rotation number, and at least the servo operation of the optical pick-up is caused to engage until the rotation number of the optical disc reaches the second target rotation number.

According to the optical disc drive of the present invention as described above, it is possible to provisionally set the rotation number of the optical disc to the second rotation number when the rotation number of the optical disc is increased to the first target rotation number, and the various servo controls such as the focus servo control, the tracking servo control and the sled control can be performed until the rotation number of the optical disc reaches the second target rotation number.

Therefore, it becomes possible to perform the focus servo, the tracking servo and the sled servo properly and reliably even if an eccentric (unblanced) optical disc is used.

In this invention, it is preferred that the initial control means is operated when the rotation number of the optical disc is to be increased to the first target rotation number from the state that the optical disc drive is turned on. Alternatively, it is also preferred that the initial control means is operated when the rotation number of the optical disc is to be increased to the first target rotation number by re-starting the rotation of the optical disc once after the rotation of the optical disc has been stopped.

Further, in the present invention, it is preferred that the initial control means is operated only when the fist target rotation number exceeds a predetermined reference rotation number.

Further, it is also preferred that the mean acceleration of the optical disc from the second target rotation number to the first target rotation number is larger than the mean acceleration of the optical disc from the start of the optical pick-up rotating mechanism to the second target rotation number.

Furthermore, the servo operation of the optical pick-up to be controlled includes at least one of a focus servo and a tracking servo.

It is preferred that the optical disc drive of the present invention further comprises means for automatically adjusting a predetermined signal used in the optical disc drive, wherein the adjustment of the predetermined signal is adapted to be performed until the rotation number of the optical disc reaches the second target rotation number. In this case, the adjustment of the predetermined signal includes at least one of adjustment of amplitude of the signal read out from the optical disc and adjustment of a reference level for canceling offset components in the signal.

The other aspect of the present invention is directed to a method for controlling an optical disc drive for playing back or recording and playing back an optical disc. The method comprises the steps of: starting rotation of an optical disc so that the rotation number of the optical disc becomes a first target rotation number; increasing the rotation number of the optical disc provisionally to a second target rotation number which is smaller than the first target rotation number; causing servo control of an optical pick-up to engage until the rotation number of the optical disc reaches the second rotation number; and increasing the rotation number of the optical disc from the second target rotation number to the first target rotation number.

In this method, it is preferred that the method is carried out when the optical disc is started to rotate from the state that the optical disc drive is turned on.

Further, it is also preferred that the method is carried out when the optical disc is re-started to rotate once after the rotation of the optical disc has been stopped.

It is also preferred that the method further comprises the step of determining whether or not the fist target rotation number exceeds a predetermined reference rotation number, and only when the fist target rotation number exceeds the predetermined reference rotation number, the rotation number of the optical disc is provisionally increased to the second target rotation number.

Further, it is also preferred that the mean acceleration of the optical disc from the second target rotation number to the first target rotation number is larger than the mean acceleration of the optical disc from the start of the optical pick-up rotating mechanism to the second target rotation number.

Furthermore, it is preferred that the servo control includes at least one of a focus servo control and a tracking servo control.

Moreover, it is also preferred that the method further comprises the step of performing adjustment of a predetermined signal used in the optical disc drive until the rotation number of the optical disc reaches the second target rotation number. In this case, it is preferred that the adjustment of the predetermined signal includes at least one of adjustment of amplitude of the signal read out from the optical disc and adjustment of a reference level for canceling offset components in the signal.

Other objects, structures and advantages of the present invention will be apparent when the following description of the preferred embodiment is considered taken in conjunction with the accompanying drawings.

BRIEF DESCRIPTION OF THE DRAWINGS

FIG. 8 is a chart which shows a format of an ATIP frame.

FIG. 14 is a drawing which shows a format of the Q data of 96 bits.

DETAILED DESCRIPTION OF THE PREFERRED EMBODIMENTS

With reference to the appended drawings, a detailed description will now be given for the preferred embodiments of an optical disc drive according to the present invention.

Figure 1:
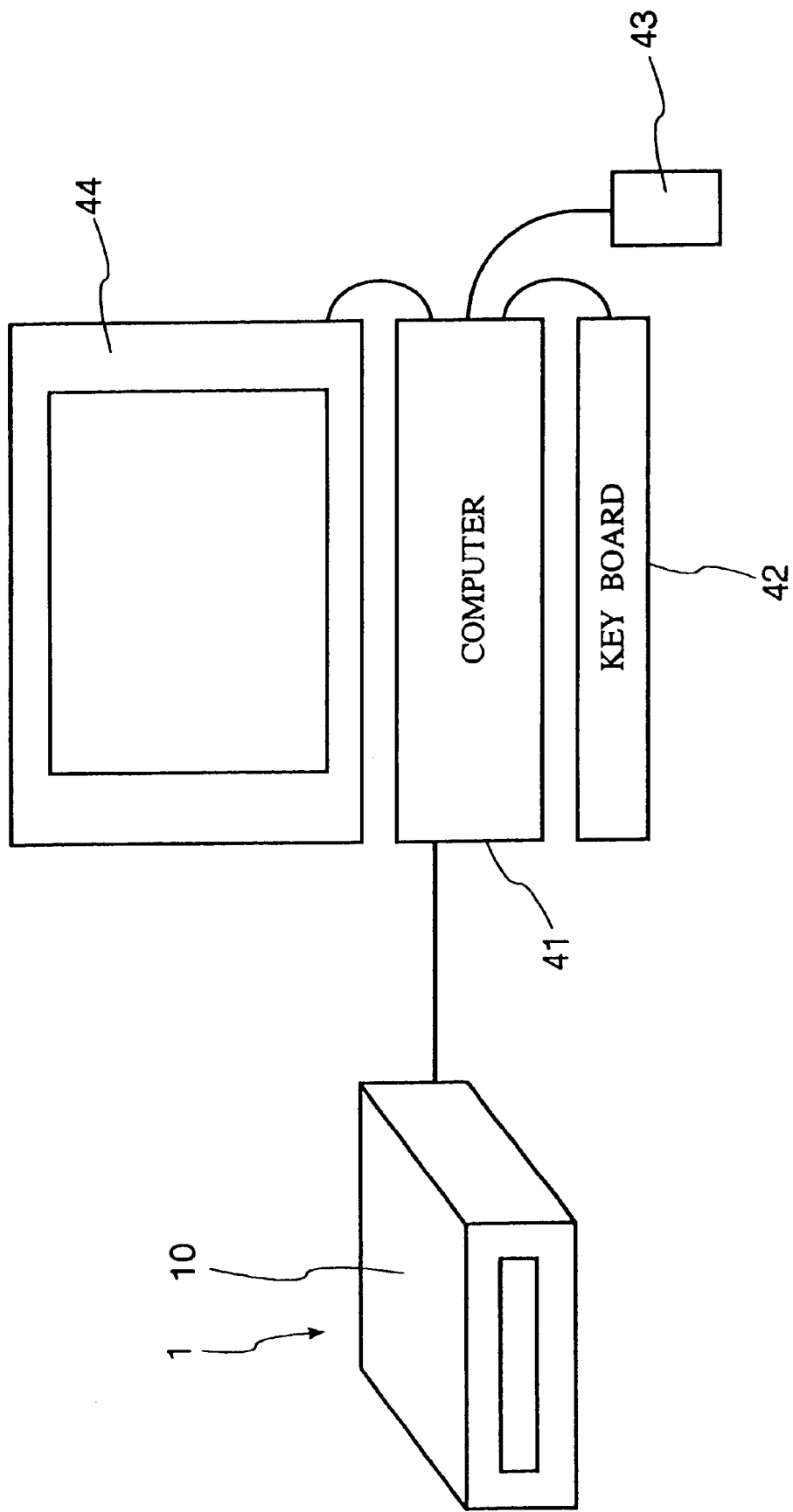
FIG. 1 is an illustration which shows a state that the optical disc drive according to the present invention is connected to an computer.
Figure 2:
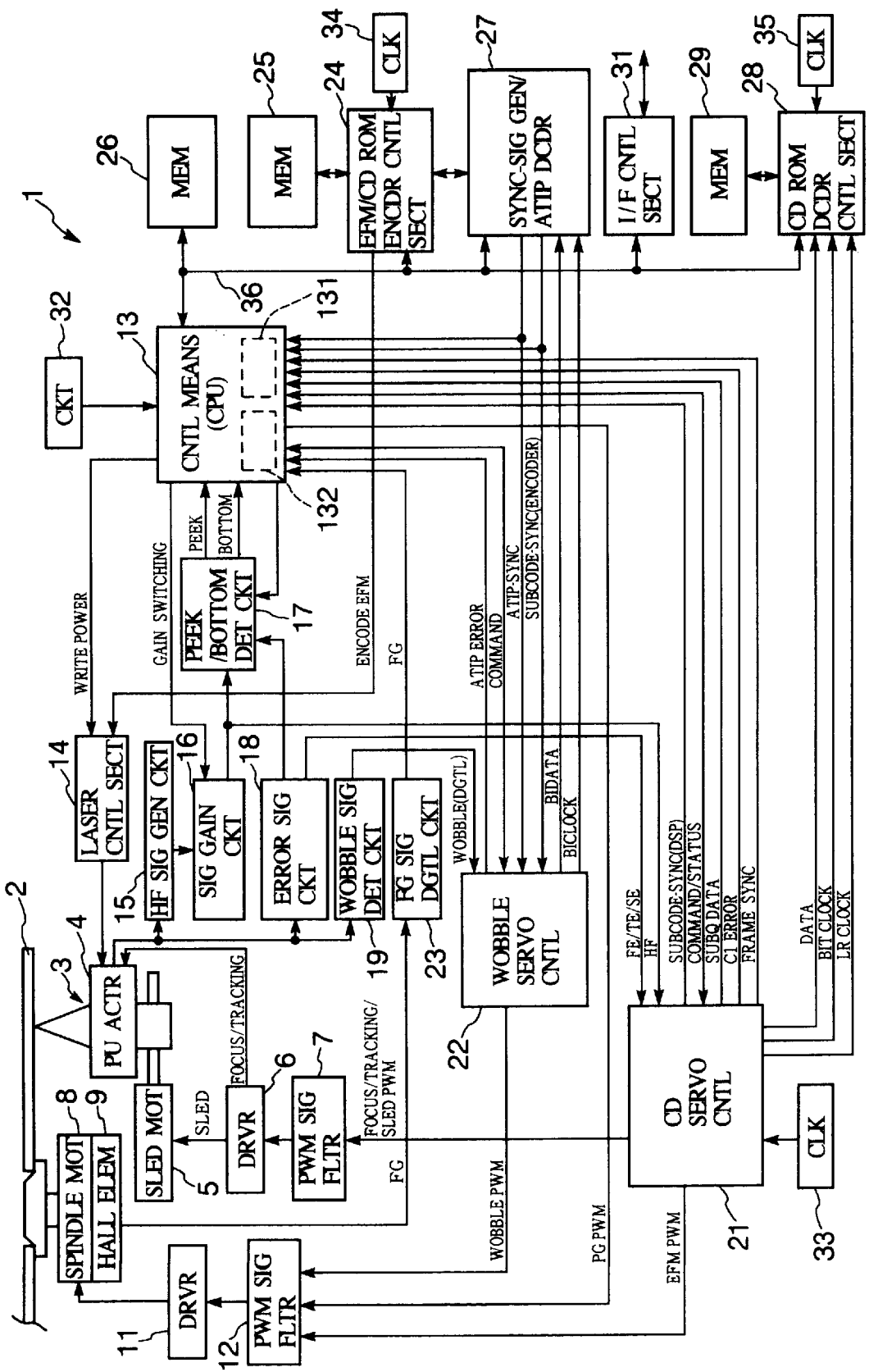
FIG. 2 is a block diagram which shows an embodiment of the optical disc drive according to the present invention.

FIG. 1 is an illustration which shows an optical disc drive 1 of the present invention in a connected state with a computer, and FIG. 2 is a block diagram which shows an embodiment of the optical disc drive 1 of the present invention.

The optical disc drive 1 shown in these drawings is a CD-R drive for recording and playing back an optical disc (CD-R/CD-Recordable) 2.

In optical discs 2 of the type of CD-R, there is formed a spiral pre-groove (WOBBLE) which is not shown in the drawing.

The pre-groove meanders at a predetermined period (22.05 kHz at the reference rotation speed (1×)), and ATIP (Absolute Time in Pre-groove) information (time information) is previously recorded with the pre-groove. The ATIP information is recorded by being biphase modulated and frequency-modulated at a carrier frequency of 22.05 kHz.

The Pre-groove functions as a guide groove when forming pits and lands (recording pits and lands) for the optical disc 2. Further, the information recorded with the pre-groove is reproduced and then utilized to control the rotation speed of the optical disc 2 and specify a recording position (absolute time) on the optical disc 2.

The optical disc drive 1 is equipped with a turntable and a spindle motor 8 for rotating the turntable (that is, for rotating the optical disc), and includes a rotation driving mechanism (not shown in the drawings) for rotating the turntable when the optical disc is loaded thereon. The rotation driving mechanism is constructed so as to be able to rotate the optical disc 2 in multiple levels of the rotational speed.

Further, in the vicinity of the spindle motor 8, there is provided a Hall element 9 for detecting the rotation of the spindle motor 8. The Hall element 9 outputs FG signals (in the form of sine wave) is arranged near the spindle motor 8. The cycle of the FG signal corresponds to the rotation number of the spindle motor 8.

Further, the optical disc drive 1 includes an optical head (hereinafter, referred to as "optical pick-up") 3 capable of movement along a radial direction of the loaded optical disc 2 (i.e., along a radial direction of the turntable); an optical pick-up moving mechanism (not shown in the drawings) equipped with a sled motor 5 to move the optical pick-up 3, that is an optical pick-up base of the optical pick-up 3 along the radial direction of the turntable; drivers 6 and 11; PWM signal smoothing filters 7 and 12; control means 13; a laser control section 14; an HF signal generating circuit 15; an HF signal gain switching circuit 16; a peak/bottom detection circuit 17; an error signal generating circuit 18; a WOBBLE signal detection circuit 19; a CD servo controller 21; a WOBBLE servo controller 22; a FG signal digitization circuit 23; an EFM/CD-ROM encoder control section 24; memories 25, 26 and 29; a SYNC signal generating/ATIP decoder 27; a CD-ROM decoder control section 28; an interface control section 31; clocks 32, 33, 34 and 35; and a casing 10 which houses all these elements. Hereinbelow, the radial direction of the optical disc 2 along which the optical pick-up 3 is capable of moving will simply be referred to as the "radial direction."

The optical pick-up 3 includes (but not shown in the drawings) an optical pick-up base equipped with a laser diode (light source) and a photodiode (light-receiving element), and an objective lens (converging lens). The operation of the laser diode is controlled by the laser control section 14.

The objective lens is supported by suspension springs provided on the pick-up base and can be moved, with respect to the pick-up base, along the radial direction and the rotational axial direction of the optical disc 2 (i.e., the axial direction of the turntable). In this way, if the objective lens is shifted from its neutral position (central position), the restoring force of the suspension springs will bias the objective lens toward the neutral position. Hereinbelow, the rotational axial direction of the optical disc 2 will simply be referred to as "axial direction."

Further, the optical pick-up 3 includes an actuator 4 to move the objective lens respectively in the radial direction and the axial direction with respect to the pick-up base.

The control means 13 is generally constructed from a microcomputer (CPU), and it carries out control of the entire optical disc drive 1, including control of the optical pick-up 3 (actuator 4), sled motor 5, spindle motor 8, laser control section14, HF signal gain switching circuit 16, peak/bottom detection circuit 17, CD servo controller 21, WOBBLE servo controller 22, EFM/CD-ROM encoder control section 24, memories 25, 26 and 29, SYNC signal generating/ATIP decoder 27, CD-ROM decoder control section 28, interface control section 31 and the like.

Further, addresses, data, commands and the like from the control means 13 are inputted via an address/data bus 36 to the EFM/CD-ROM encoder control section 24, memory 26, SYNC signal generating/ATIP decoder 27, CD-ROM decoder control section 28, interface control section 31 and the like.

An separate apparatus (in the present embodiment, a computer 41) can be freely connected to (and disconnected from) the optical disc drive 1 via the interface control section 31, and this makes it possible for the optical disc drive 1 and the computer 41 to communicate with each other.

As for the interface control section 31, it is possible, for example, to use an ATAPI (IDE) (ATAPI Standard), SCSI (SCSI Standard) or the like.

A keyboard 42, a mouse 43 and a monitor 44 are connected to the computer 41.

In this regard, it is to be noted that the interface control section 31 constitutes a transmission means, and that the HF signal generating circuit 15, the HF signal gain switching circuit 16, the peak/bottom detection circuit 17, the error signal generating circuit 18, the WOBBLE signal detection circuit 19, the CD servo controller 21 and the WOBBLE servo controller 22 constitute a signal processing means.

Next, the operation of the optical disc drive 1 will be described.

While carrying out focus control, tracking control, sled control and rotation control (rotation speed control), the optical disc drive 1 records (writes in) and plays back (read out) information (data) to and from a predetermined track of the optical disc 2. Hereinbelow, the operations carried out during (1) recording, (2) playback (reproduce), (3) focus control, tracking control and sled control, and (4) rotation control (rotation speed control) will be described in this order in this order.

First, as shown in FIG. 2, a predetermined COMMAND signal from the control means 13 is inputted into the CD servo controller 21. Further, a predetermined COMMAND signal from the control means 13 is inputted into the WOBBLE servo controller 22.

These COMMAND signals transmitted from the control means 13 to the CD servo controller 21 and the WOBBLE servo controller 22, respectively, are signals indicating predetermined commands (e.g., to start controls and the like).

Then, a predetermined STATUS signal from the CD servo controller 21 is inputted into the control means 13. Further, a predetermined STATUS signal from the WOBBLE servo controller 22 is inputted into the control means 13.

These STATUS signals are in response to the commands mentioned above, namely, such status signals indicate the statuses for the controls mentioned above (e.g., control success, control failure, control being carried out and other statuses).

(1) Recording

When data (signals) is to be recorded (written in) in the optical disc 2, the pre-groove formed in the optical disc 2 is reproduced (read out), after which the data is recorded in accordance with the pre-groove.

When the data (signals) to be recorded on the optical disc 2 is inputted into the optical disc drive 1 via the interface control section 31, such data is inputted into the EFM/CD-ROM encoder control section 24.

In the EFM/CD-ROM encoder control section 24, such data is encoded in response to a clock signal (i.e., at the timing of the clock signal) from the clock 34 and then undergoes modulation (EFM modulation) by a modulation method known as EFM (Eight to Fourteen Modulation) to form ENCODE EFM signals.

Figure 3:
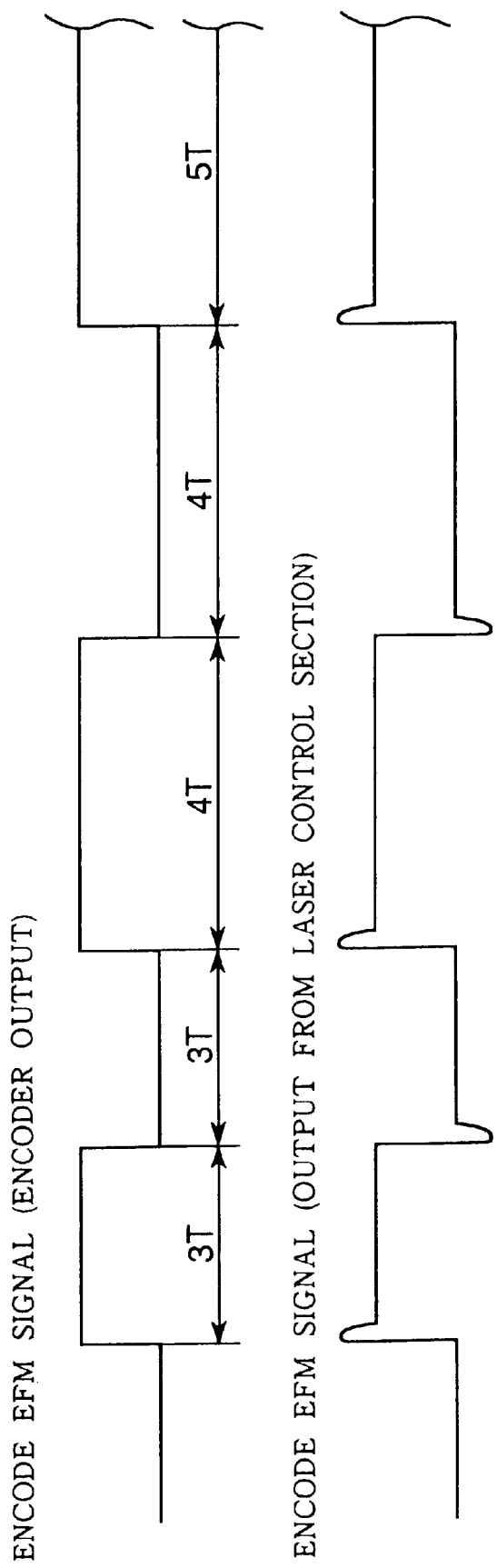
FIG. 3 is a timing chart which shows the ENCODE EFM signal from the EFM/CDROM encoder and the ENCODE EFM signal from the laser control section in the optical disc drive according to the present invention.

As shown in FIG. 3, these ENCODE EFM signals are formed from pulses each having a predetermined length (period) of any one of 3T–11T.

Figure 4:
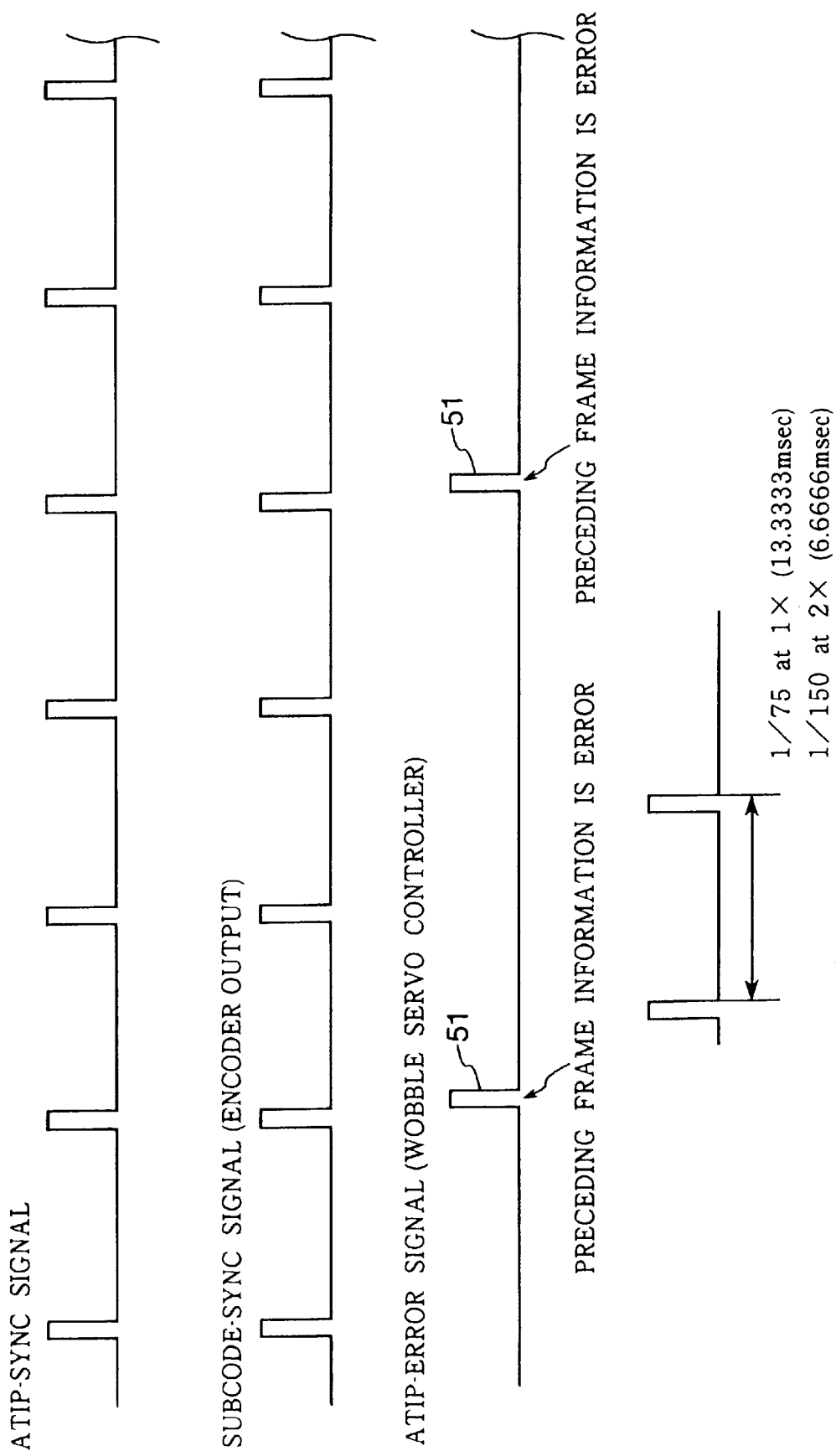
FIG. 4 is a timing chart which shows the ATIP-SYNC signal, the SUBCODE-SYNC signal from the SYNC signal generating/ATIP decoder and the ATIP error signal in the optical disc drive according to the present invention.
Figure 5:
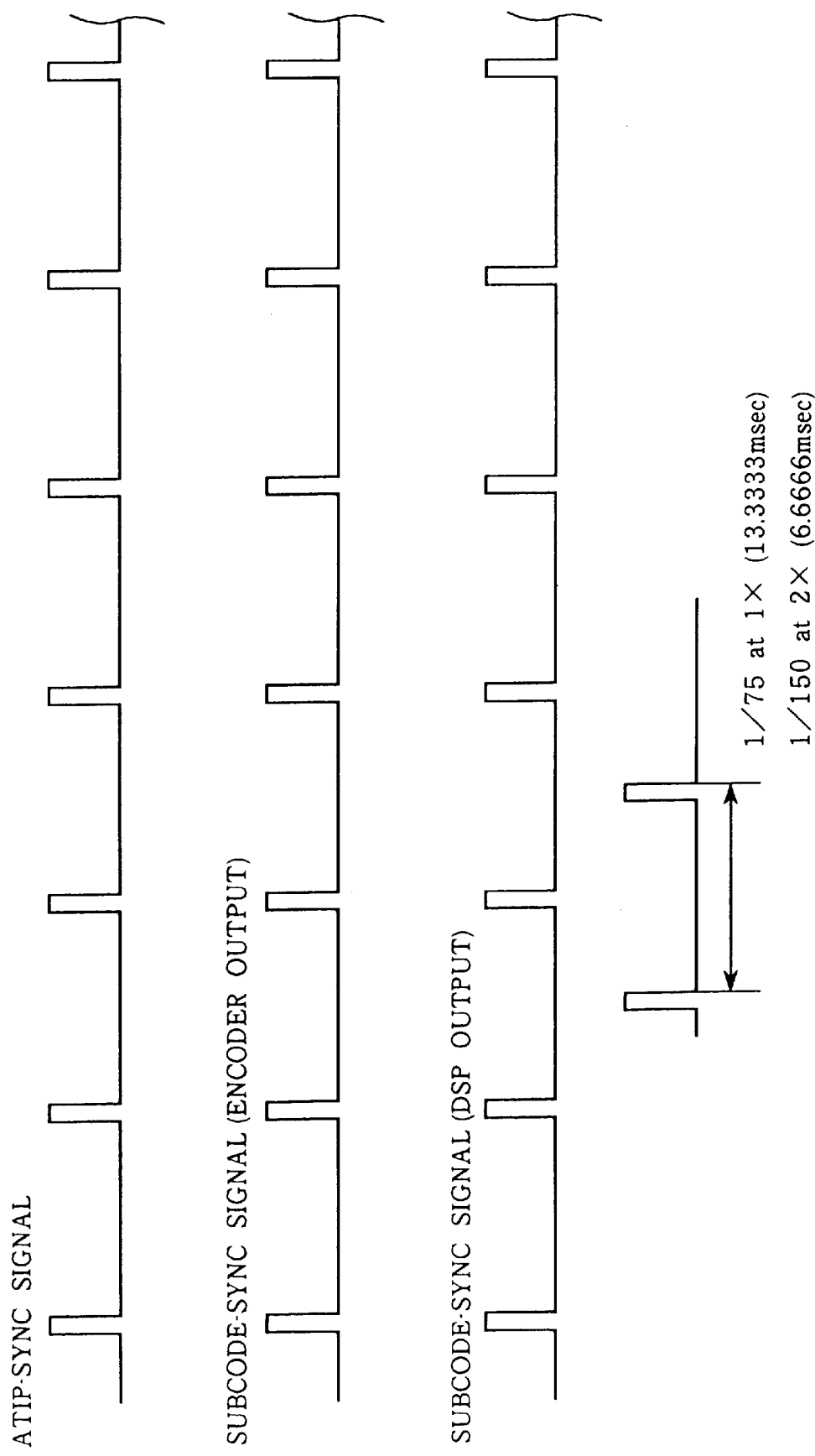
FIG. 5 is a timing chart which shows the ATIP-SYNC signal, the SUBCODE-SYNC signal from the SYNC signal generating/ATIP decoder and the SUBCODE-SYNC signal from the CD servo controller in the optical disc drive according to the present invention.

Further, as shown in FIGS. 4 and 5, in the EFM/CD-ROM encoder control section 24, the clock signal from the clock 34 is divided, and a SUBCODE-SYNC signal (used as the second synchronizing signal) formed by a predetermined period pulse is generated. The pulse period of this SUBCODE-SYNC signal (i.e., the time interval between adjacent pulses) is $1/75$ second for the case of the reference rotation speed (1×) and $1/450$ second for the case of the 6 times rotation speed.

During the encoding described above, a synchronizing signal, namely, a SYNC pattern is added to the ENCODE EFM signal based on the SUBCODE-SYNC signal (i.e., on the timing of the SUBCODE-SYNC signal). Namely, a SYNC pattern is respectively added to the portion corresponding to the head portion of each SUBCODE frame.

This ENCODE EFM signal is inputted into the laser control section 14 from the EFM/CD-ROM encoder control section 24.

Further, an analog WRITE POWER signal (voltage) is outputted from a D/A converter (not shown in the drawings) in the control means 13 and it is then inputted into the laser control section 14.

Based on the ENCODE EFM signal, the laser control section 14 switches the level of the WRITE POWER signal from the control means 13 to a high level (H) or a low level (L), and then outputs such signal, thereby controlling the operations of the laser diode of the optical pick-up 3.

In particular, during the period of time in which the ENCODE EFM signal is in a high (H) level, the laser control section 14 outputs a high level (H) WRITE POWER signal. Namely, the laser output is increased (to a level for writing in data). Then, during the period of time in which the ENCODE EFM signal is in a low (L) level, the laser control section 14 outputs a low level (L) WRITE POWER signal. Namely, the laser output is decreased (returned to a level for reading out data).

Thus, when the ENCODE EFM signal level is in the high (H) level, a pit having a predetermined length is formed in the optical disc 2, and when the ENCODE EFM signal level is in the low (L) level, a land having a predetermined length is formed in the optical disc 2.

In this way, data is written (recorded) in a predetermined track of the optical disc 2 with thus formed pits and lands.

In the EFM/CD-ROM encoder control section 24, a predetermined ENCODE EFM signal (random EFM signal) is generated in addition to the above-mentioned ENCODE EFM signal. This random EFM signal is used for output adjustment (power control) of the laser when trial writing in a test area is carried out under OPC (Optimum Power Control) procedure.

When trial writing is carried out in a test area under the OPC procedure, the random EFM signal is inputted into the laser control section 14 from the EFM/CD-ROM encoder control section 24.

Further, when trial writing is carried out in a test area during the OPC procedure, 15-step level WRITE POWER signals are generated in the control means 13, and these WRITE POWER signals are outputted from the D/A converter (not shown in the drawings) provided in the control means 13 and then inputted into the laser control section 14.

Then, based on the random EFM signal, the laser control section 14 switches the level of the WRITE POWER signals from the control means 13 to a high level (H) or a low level (L) and then outputs such signals, thereby controlling the operations of the laser diode of the optical pick-up 3. This is done for each of the 15-step level WRITE POWER signals.

In this way, in the OPC procedure, trial writing in a test area can be carried out with laser light having the 15-step output levels.

Further, when writing data in the optical disc 2, laser light at a read-out output level is emitted from the laser diode of the optical pick-up 3 onto the pre-groove of the optical disc 2, and the light reflected therefrom is received by the split photodiode of the optical pick-up 3.

Figure 6:
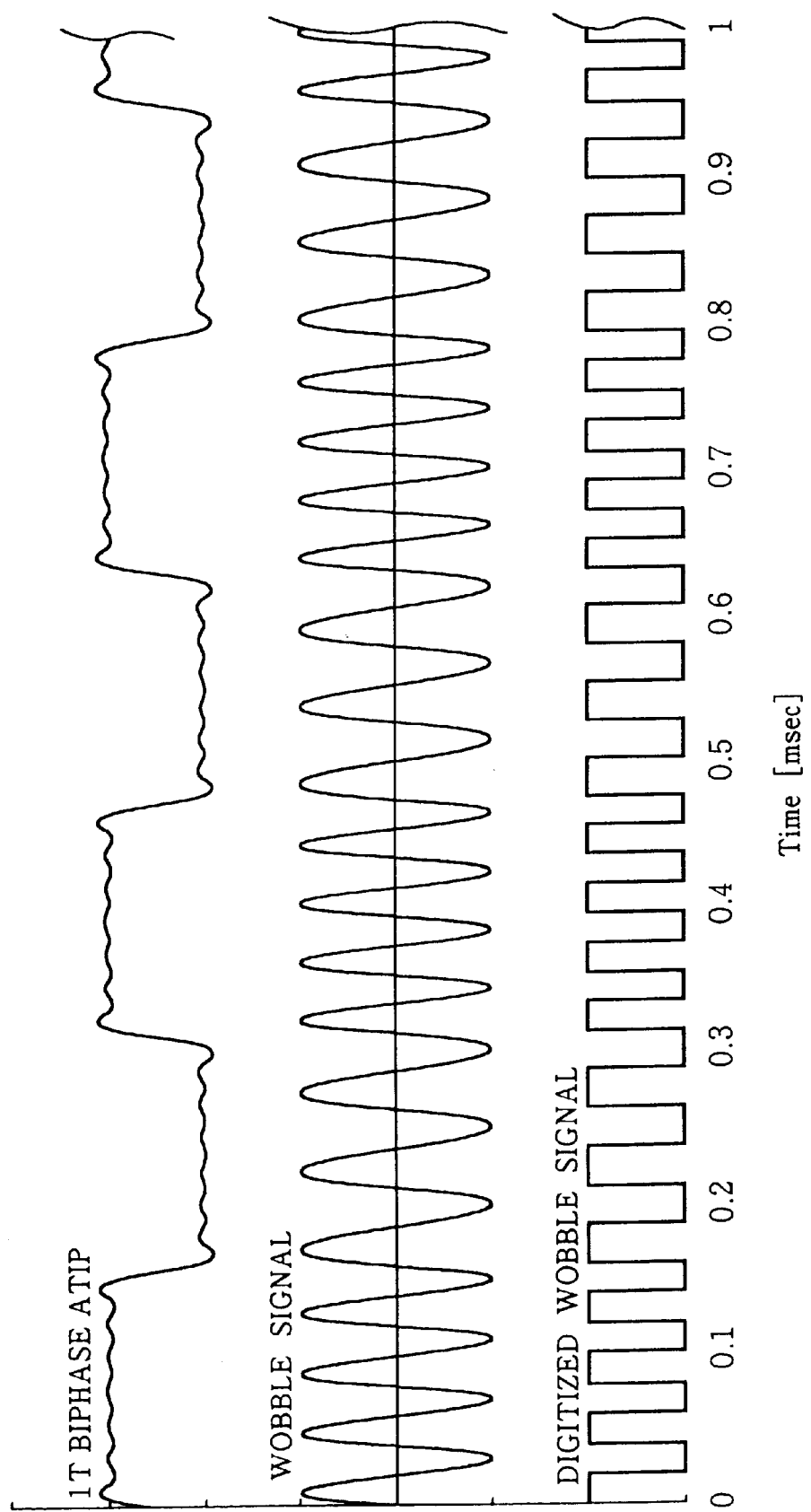
FIG. 6 is a timing chart which shows the 1T Biphase ATIP timing, the WOBBLE signal and the digitized WOBBLE signal in the optical disc drive according to the present invention.

The WOBBLE signal shown in FIG. 6 is outputted from this split photodiode. As was mentioned above, this WOBBLE signal has a 22.05 kHz frequency signal at the reference rotation speed (1×), and includes a signal obtained by biphase modulating the ATIP information and further frequency-modulating it at a carrier frequency of 22.05 kHz.

This WOBBLE signal is inputted into the WOBBLE signal detection circuit 19 where it undergoes digitization.

The digitized WOBBLE signal is then inputted into the WOBBLE servo controller 22.

Figure 7:
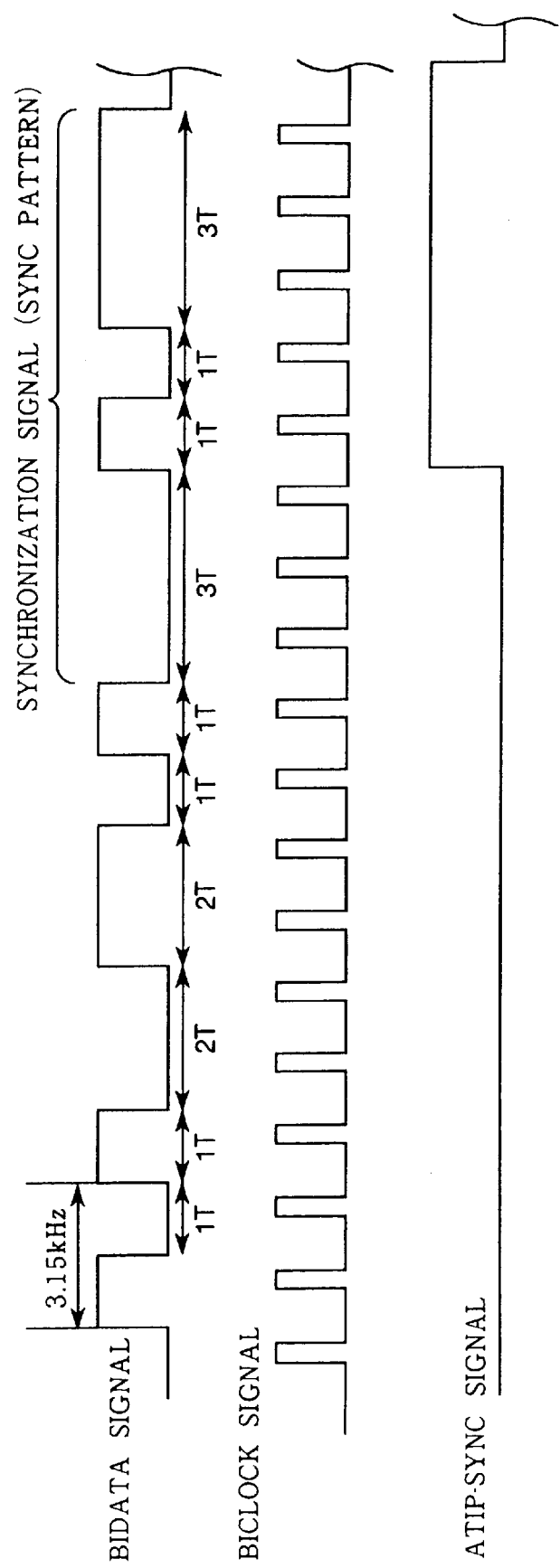
FIG. 7 is a timing chart which shows the BIDATA signal, the BICLOCK signal and the ATIP-SYNC signal in the optical disc drive according to the present invention.

In the WOBBLE servo controller 22, the frequency-modulated ATIP information in the WOBBLE signal is demodulated, and the BIDATA signal (biphase signal) shown in FIG. 7 is obtained. This BIDATA signal is a pulse signal having a length of any one of 1T–3T. Further, by biphase demodulating and then decoding this BIDATA signal, it is possible to obtain the ATIP information.

Further, in a digital PLL circuit (not shown in the drawings) provided in the WOBBLE servo controller 22, a clock is generated based on the BIDATA signal to obtain the BICLOCK signal shown in FIG. 7. This BICLOCK signal is used in timing of the decoding of the BIDATA signal (described later).

The BIDATA signal and the BICLOCK signal are respectively inputted into the SYNC signal generating/ATIP decoder 27.

In the SYNC signal generating/ATIP decoder 27, the BIDATA signal is biphase demodulated based on the BICLOCK signal, and the biphase demodulated BIDATA signal is then decoded to obtain the ATIP information. Further, the ATIP-SYNC signal (used as the first synchronizing signal) shown in FIG. 7 is also generated.

In this case, as shown in FIG. 7, the ATIP-SYNC signal pulse is generated when the SYNC pattern included in the BIDATA signal is detected. The period of this ATIP-SYNC signal pulse (i.e., the time interval between adjacent pulses) is $1/75$ second for the case of the reference rotation speed (1×) and $1/450$ second for the case of the six times rotation speed (6×).

This ATIP-SYNC signal is inputted into the control means 13 and the WOBBLE servo controller 22, respectively.

Further, the decoded ATIP information is inputted into the control means 13. In this way, the control means 13 gets a position on the optical disc 2 (the absolute time) from this ATIP information.

The above-mentioned SUBCODE-SYNC signal from the EFM/CD-ROM encoder control section 24 is inputted into the SYNC signal generating/ATIP decoder 27, after which such SUBCODE-SYNC signal is respectively inputted into the control means 13 and the WOBBLE servo controller 22 from the SYNC signal generating/ATIP decoder 27.

FIG. 8 is a chart showing the frame format of the ATIP frame. As shown in this drawing, the frame format of one ATIP frame is comprised of 4-bits for synchronizing signal (Sync); 8-bits for minutes (Min); 8-bits for seconds (Sec); 8-bits for frames (Frame); and 14-bits for error detection code (CRC: Cyclic Redundancy Code).

In the WOBBLE servo controller 22, the ATIP information of each of the ATIP frames undergoes an error detection process (to determine whether or not the ATIP information is wrong).

In this ATIP information error detection process, if the results of a predetermined operation performed on the data of the Sync, Minutes, Seconds and other data of the ATIP frame match the error detection code (CRC), such a state is defined as a "normal", and if the results don't match the error detection code, such a state is defined as a "ATIP error".

In this case, if it is found that the ATIP information is wrong, namely if an ATIP error is detected, a pulse 51 will be generated in the WOBBLE servo controller 22 as an ATIP error signal, and then it is outputted, as shown in FIG. 4.

The ATIP error signal which is formed from the pulse 51 is inputted into a counter (counting means) 131 provided in the control means 13. Then, the number of the pulses of the ATIP error signal is counted by the counter 131, and the number of the pulses of the ATIP error signal is defined as the number of ATIP errors.

Now, because this error detection process is carried out on the ATIP information for every ATIP frame, a maximum of 75 ATIP errors can occur in 75 ATIP frames (in one second at the reference rotation speed (1×)).

In this connection, a detection means for detecting such ATIP errors is constructed from the WOBBLE servo controller 22.

The counted value of the ATIP error is stored in the memory 26 and is also transmitted to the computer 41 via the interface control section 31 to be utilized in examining the optical disc drive 1 (to judge the recording performance of the optical disc drive 1).

The ATIP-SYNC signal inputted into the control means 13 is utilized to the timing of renewal of ATIP time.

Further, the ATIP-SYNC signal inputted into the WOBBLE servo controller 22 is used for synchronization with the SUBCODE-SYNC signal.

The SUBCODE-SYNC signal inputted into the control means 13 is used for compensation (interpolation) of the ATIP time information described hereinbelow and the measurement of the ATIP error described above.

Further, the SUBCODE-SYNC signal inputted into the WOBBLE servo controller 22 is used as a reference signal for synchronization in the same manner as the ATIP-SYNC signal described above.

In this connection, the synchronization is carried out such that the timing of the SUBCODE-SYNC signal in the EFM data generated when writing data becomes substantially synchronized with the timing of the ATIP-SYNC signal obtained from the optical disc 2.

Figure 9:
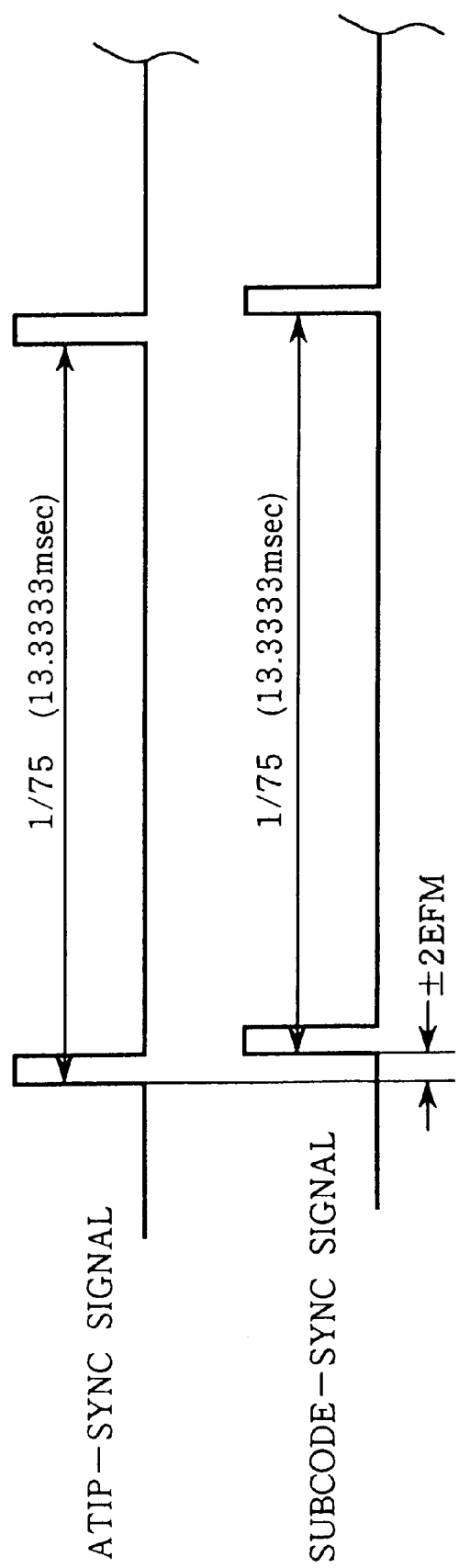
FIG. 9 is a timing chart which shows the ATIP-SYNC signal and the SUBCODE-SYNC signal in the optical disc drive according to the present invention.

As shown in FIG. 9, the SUBCODE-SYNC signal and the ATIP-SYNC signal are normally allowed to shift up to ±2 EFM frames at the respective position on the entire optical disc 2.

(2) Playback

When data (signals) are to be played back (read out) from the optical disc 2, the level of the WRITE POWER signal supplied from the laser control section 14 is maintained at a predetermined DC level corresponding to a read-out output, and in this way, the laser output is maintained at the read-out output level. Normally, the read-out output (the output of the main beam) is set to be equal to or less than 0.7 mW.

Now, when data is being read out from the optical disc 2, laser light at the read-out output is emitted from the laser diode of the optical pick-up 3 onto a predetermined track of the optical disc 2, and the light reflected therefrom is received by the split photodiode of the optical pick-up 3.

Then, electrical currents (voltages) corresponding to the quantity of received light are outputted respectively from each light-receiving portion of the split photodiode of the optical pick-up 3, and these currents, namely, each signal (detected signal) is respectively inputted into the HF signal generating circuit 15 and the error signal generating circuit 18.

In the HF signal generating circuit 15, these detected signals undergo addition, subtraction and the like to generate an HF (RF) signal.

This HF signal is an analog signal corresponding to pits and lands formed in the optical disc 2.

As described above, this HF signal is inputted into the HF signal gain switching circuit 16 and then amplified. The amplification factor of the HF signal gain switching circuit 16 is switched by a gain switching signal from the control means 13.

The amplified HF signal (hereafter, referred to as the "HF signal") is respectively inputted into the peak/bottom detection circuit 17 and the CD servo controller 21.

Further, a tracking error (TE) signal (which is described under (3) Focus Control, Tracking Control and Sled Control) is inputted into the peak/bottom detection circuit 17.

Figure 10:
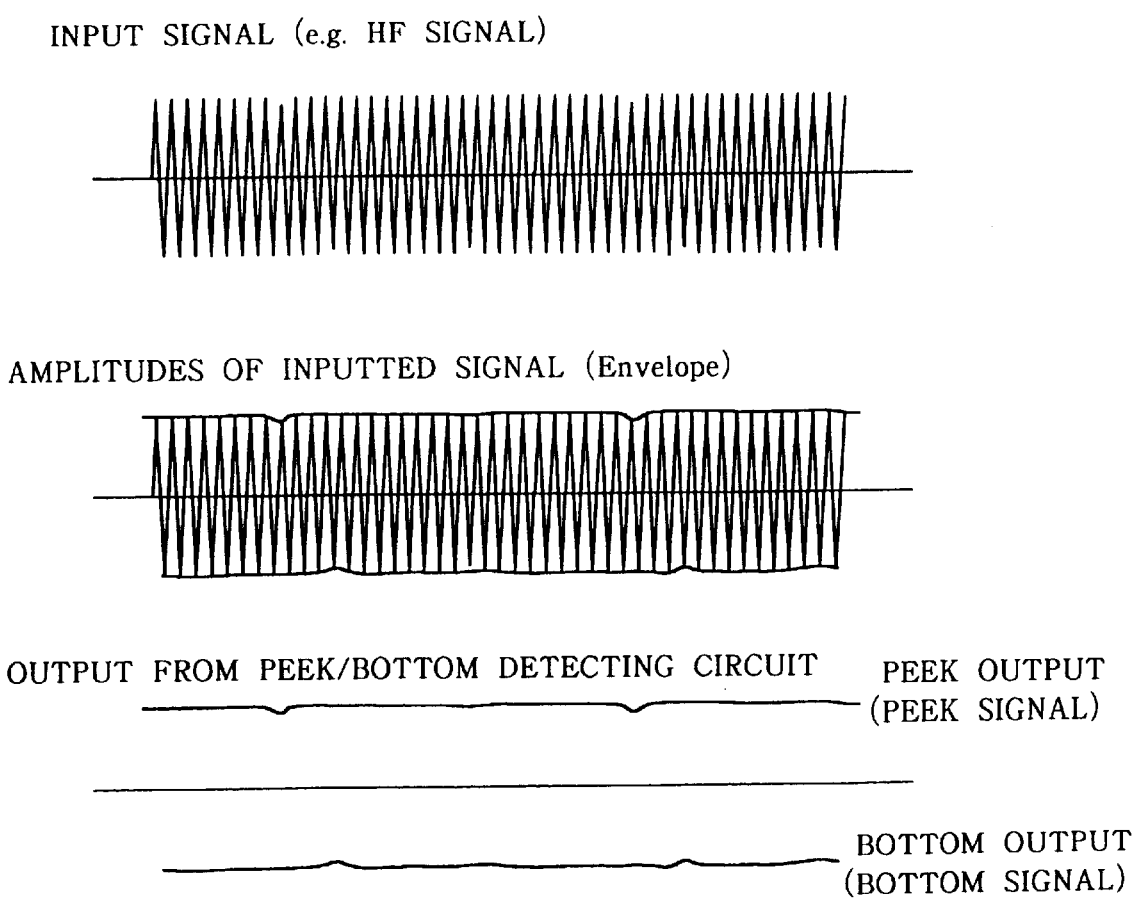
FIG. 10 is a timing chart which shows an input signal inputted to the peek/bottom detecting circuit, the amplitudes of the inputted signal (envelope), and the PEEK signal and the BOTTOM signal in the optical disc drive according to the present invention.

As shown in FIG. 10, in the peak/bottom detection circuit 17, the amplitudes of the inputted signals (envelope), such as the HF signal and the tracking signal, are extracted.

The top and bottom of the amplitude are referred to respectively as the "PEAK" and "BOTTOM", wherein the signal corresponding to the tops of the amplitudes is referred to as "PEEK signal", and the signal corresponding to the bottoms of the amplitudes is referred to as "BOTTOM signal".

The PEEK signal and the BOTTOM signal are respectively inputted into the A/D converter (not shown in the drawings) in the control means 13, and in this A/D converter such signals are converted into digital signals.

These PEAK and BOTTOM signals are used, for example, to measure the amplitude, to adjust the amplitude of the tracking error signal, to calculate the β value in the OPC (Optimum Power Control) procedure, and to determine the presence or absence of the HF signal.

In the CD servo controller 21, the HF signal is digitized and EFM demodulated to obtain an EFM signal. This EFM signal is a signal formed by a pulse having a length (period) corresponding to any one of 3T–11T.

Then, in the CD servo controller 21, an error correction (CIRC error correction) which uses an error correction code referred to as a CIRC (Cross Interleaved Read Solomon Code) is carried out twice on this EFM signal.

In this case, the first CIRC correction is referred to as a "C1 error correction", and the second CIRC correction is referred to as the "C2 error correction".

Further, the case where error correction can not be carried out by the first CIRC correction, namely by the C1 error correction is referred to as a "C1 error", and the case where error correction can not be carried out by the second CIRC correction, namely by the C2 error correction is referred to as a "C2 error".

Figure 11:
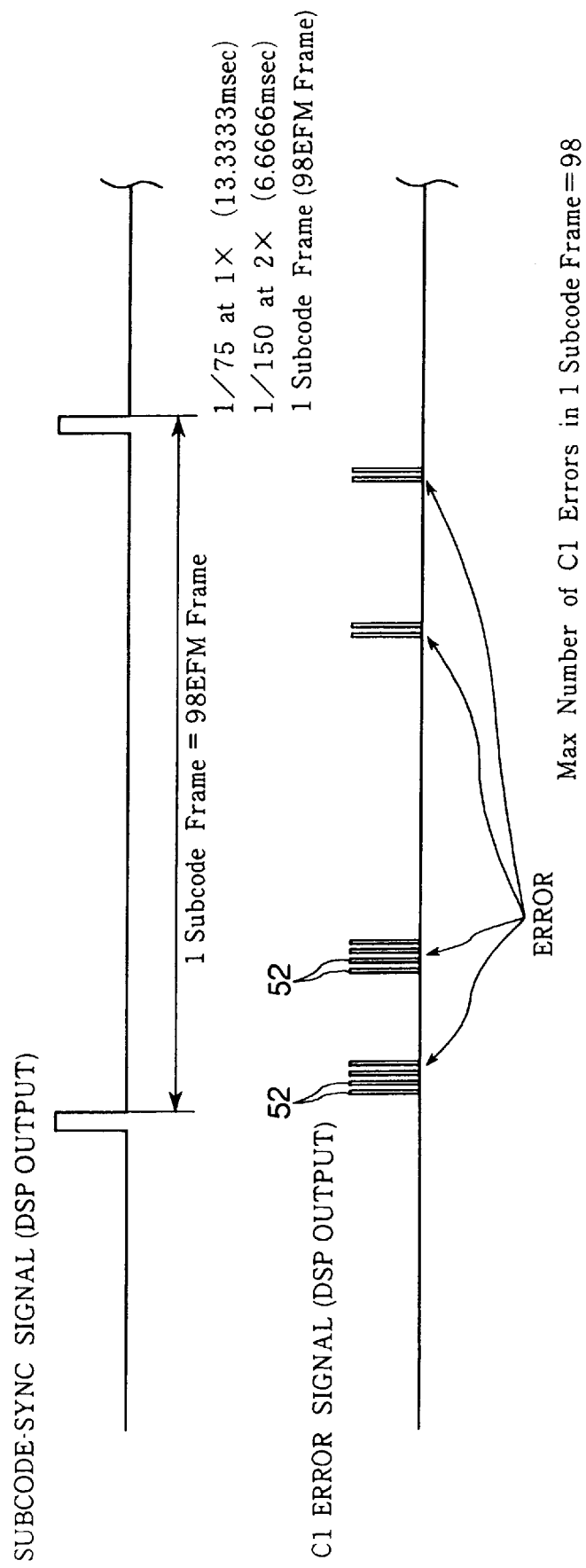
FIG. 11 is a timing chart which shows the SUBCODE-SYNC signal from the CD servo controller and the C1 ERROR signal in the optical disc drive according to the present invention.

As shown in FIG. 11, if a C1 error is detected during the C1 error correction in the CD servo controller 21, a pulse 52 is generated and then it is outputted.

The C1 error signal comprised of the pulses 52 is inputted into the counter 131 of the control means 13. Then, the number of the pulses of the C1 error signal is counted (measured) by the counter 131 as the number of C1 errors.

Now, because one subcode frame is comprised of 98 EFM frames, a maximum number of 7350 C1 and C2 errors can occur respectively in 75 subcode frames (in one second at the reference rotation speed (1×)).

In this regard, it is to be understood that the CD servo controller 21 constitutes a detection means for detecting the C1 error.

The counted value of C1 errors is stored in the memory 26 and is also transmitted to the computer 41 via the interface control section 31 to be utilized in examining the optical disc drive 1 (to judge the playback performance or the recording/playback performance of the optical disc drive 1).

In the CD servo controller 21, the EFM signal after CIRC error correction has been carried out is decoded (converted) into a predetermined format data, namely, a DATA signal.

Next, a description will be given for a typical case in which audio data (music data) is recorded on an optical disc 2 and its EFM signal is decoded into an audio format DATA signal.

Figure 12:
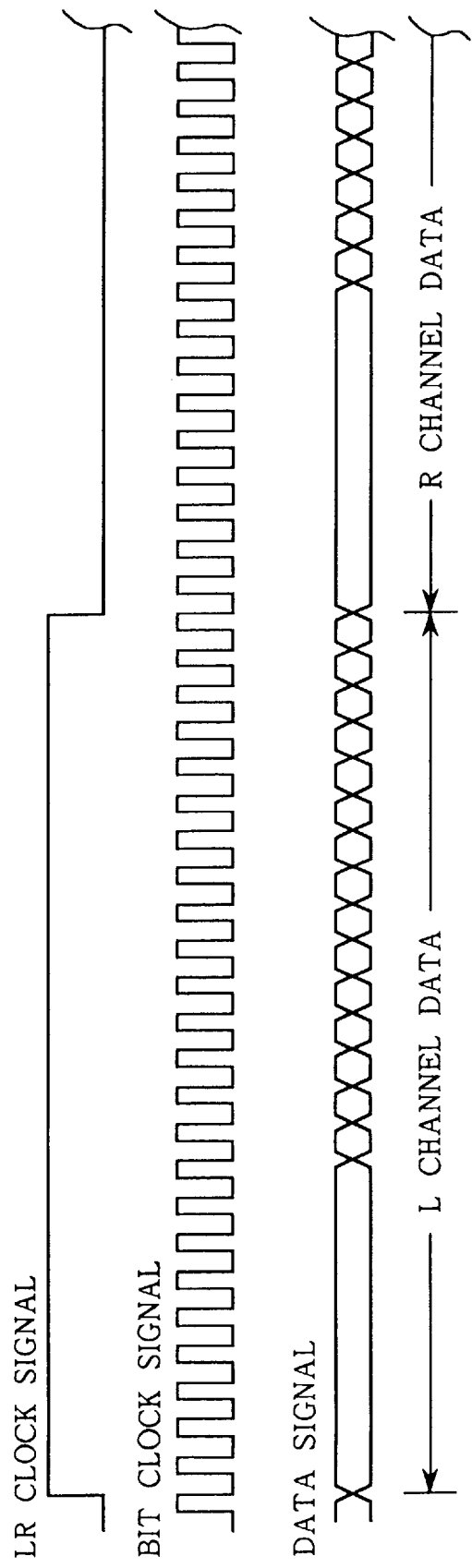
FIG. 12 is a timing chart which shows the DATA signal of an audio format, the LRCLOCK signal and the BITCLOCK signal in the optical disc drive according to the present invention.

In this connection, FIG. 12 is a timing chart showing an audio format DATA signal, an LRCLOCK signal and a BITCLOCK signal.

As shown in this drawing, in the CD servo controller 21, the EFM signal is decoded into a DATA signal comprised of 16-bit L-channel data and 16-bit R-channel data based on a clock signal from the clock 33.

Further, in the CD servo controller 21, the BITCLOCK signal and the LRCLOCK signal are respectively generated based on the clock signal from the clock 33. This BITCLOCK signal is a serial data transfer clock.

Further, the LRCLOCK signal is a signal for discriminating the L-channel data and the R-channel data in the DATA signal. In this case, the high (H) level of the LRCLOCK signal represents the L-channel data, and the low (L) level of the LRCLOCK signal represents the R-channel.

Now, in the case where normal data other than audio data is recorded on the optical disc 2, the EFM signal thereof is also decoded into a DATA signal comprised of the above-mentioned 16-bit L-channel data and 16-bit R-channel data.

The DATA signal, the LRCLOCK signal and the BITCLOCK signal are respectively inputted into the CD-ROM decoder control section 28.

In the case where error correction information such as ECC (Error Correction Code)/EDC (Error Detecting Code) is recorded on the optical disc 2, error correction is carried out for the DATA signal in the CD-ROM decoder control section 28.

This ECC/EDC is an error correction code used in a CD-ROM MODE 1 format. With this error correction, it is possible to reduce the bit error rate to a degree of $10^{-12}$.

Next, in the CD-ROM decoder control section 28, the DATA signal is decoded into predetermined format data for communication (transmission) based on the clock signal from the clock 35, and this decoded data is then transmitted to the computer 41 via the interface control section 31.

In the computer 41, for example, this decoded data is encoded, and then this encoded data is recorded (copied) into a predetermined recording medium (e.g., a hard disc).

Figure 13:
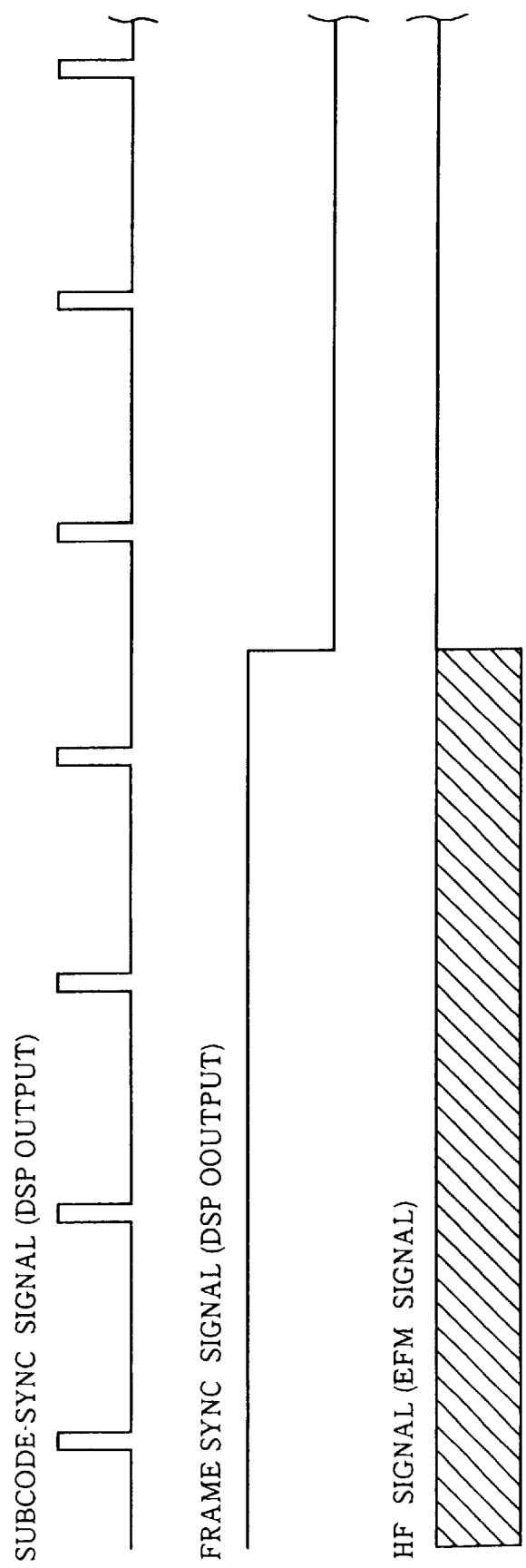
FIG. 13 is a timing chart which shows the SUBCODE-SYNC signal from the CD servo controller, the FRAM SYNC signal, the HF signal (EFM signal) in the optical disc drive according to the present invention.

Further, the FRAME SYNC signal shown in FIG. 13 is generated in the CD servo controller 21.

The level of this FRAME SYNC signal becomes high (H) when the HF signal is inputted into the CD servo controller 21 and the EFM signal is being synchronized at a specified period (3T–11T). Further, if no HF signal becomes inputted (i.e., if there becomes no synchronization of the EFM signal), the level of the FRAME SYNC signal is switched from a high (H) level to a low (L) level at the respective EFM frame unit.

In this regard, it is to be understood that, in the case of the reference rotation speed (1×), the length (period) of one EFM frame is 136 μsec, and 98 EFM frames form one subcode frame.

This FRAME SYNC signal is inputted into the control means 13, and it is used for detecting the termination of the HF signal.

Further, a SUBQ DATA signal is inputted into the control means 13 from the CD servo controller 21.

This SUBQ DATA signal is a signal which represents Q data in the subcode data.

The subcode includes eight types referred to as P, Q, R, S, T, U, V and W. One EFM frame includes a subcode of one byte in which each of P–W data is recorded with one bit, respectively.

Now, because one subcode frame is comprised of 98 EFM frames, with each EFM frame having one bit for each P–W data, there are a total of 98 bits for each P–W data in one subcode frame. However, because the first two EFM frames are used for the SYNC pattern (synchronization signal), there are actually 96 bits for each P–W data.

Next, FIG. 14 is a chart showing the format of the 96 bits of Q data. The CONTROL given by Q1–Q4 (4 bits) shown in this drawing are used to discriminate normal data or audio data.

Further, the ADDRESS given by Q5–Q8 (4 bits) represents the contents of the data in Q9–Q80 (72 bits).

Further, the CRC (Cyclic Redundancy Code) in Q81–Q96 (16 bits) is used to detect errors (to judge whether or not the data is wrong).

Furthermore, from this Q data it is possible to obtain information such as the absolute time information on the optical disc 2, the information of the present track, lead-in and lead-out, the music number, and a TOC (Table of Contents) recorded in the lead-in area.

The control means 13 obtains such information from the Q data and then carries out predetermined operations.

Further, the SUBCODE-SYNC signal is inputted into the control means 13 from the CD servo controller 21.

Figure 15:
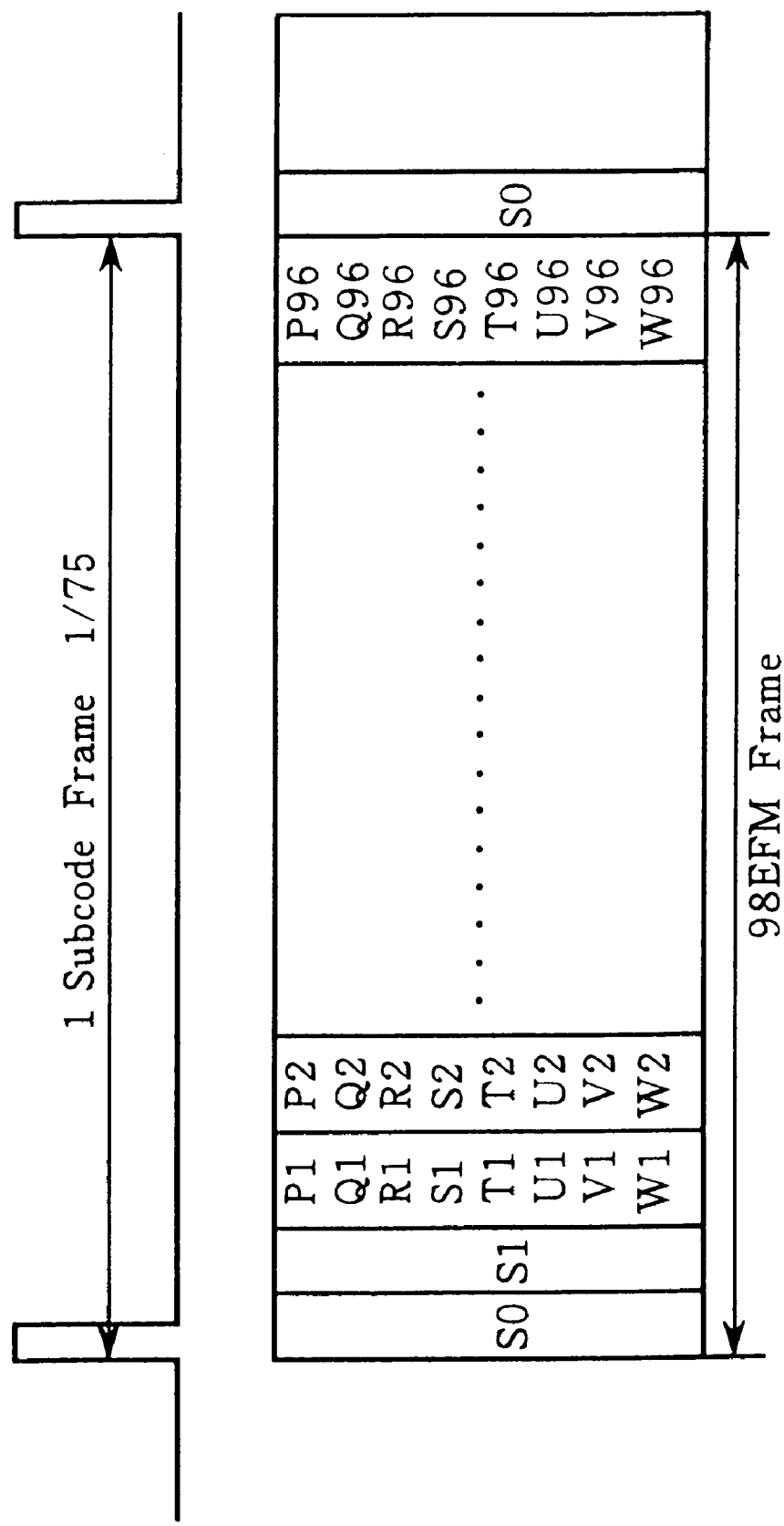
FIG. 15 is a drawing which shows one subcode frame.

Now, as shown in FIG. 15, there are 98 bytes of subcode data in 98 EFM frames, and as mentioned above, the SYNC pattern (synchronization signal) is recorded in the two bytes which form the first two EFM frames, namely, S0 and S1.

When this SYNC pattern is detected, the CD servo controller 21 generates a pulse and then outputs it. Namely, a pulse is generated and outputted for every subcode frame (98 EFM frames). The signal which is formed by this pulse is the SUBCODE-SYNC signal. Further, the SYNC pattern is outputted 75 times every second in the case of the reference rotation speed (1×) 450 times every second in the case of the 6 times rotation speed (6×).

Further, in the CD servo controller 21, the Q data is renewed after the SUBCODE-SYNC signal pulse has been detected. Then, the renewed Q data is read into the control means 13.

(3) Focus Control, Tracking Control and Sled Control

In the error signal generating circuit 18, a focus error (FE) signal, a tracking error (TE) signal and a sled error (SE) signal are respectively generated by carrying out addition and subtraction and the like on the detection signal from the split photodiode.

The focus error signal is a signal which represents the amount of displacement of the objective lens along the rotational axial direction away from the focus position (i.e., the amount of the displacement of the objective lens from the focus position) and the direction thereof.

The tracking error signal is a signal which represents the amount of displacement of the objective lens along a radial direction from the center of the track (Pre-groove) (i.e., the amount of the displacement of the objective lens from the center of the track) and the direction thereof.

Further, the sled error signal is a signal used for sled control, namely, in the sled servo (i.e., the servo for moving the pick-up base of the optical pick-up 3). In other words, the sled error signal is a signal which represents the amount of the displacement of the optical pick-up 3 along a radial direction (i.e., the moving direction of the optical pick-up 3) from the target position (proper position) of the optical pick-up 3 and the direction thereof.

The focus error signal is inputted into the CD servo controller 21. Further, the tracking error signal is also inputted into the CD servo controller 21 and into the peak/bottom detection circuit 17, respectively, as described above. Furthermore, the sled error signal is also inputted into the CD servo controller 21.

Using these focus error signal, tracking error signal and sled error signal, the optical disc drive 1 carries out focus control, tracking control and sled control for a predetermined track.

During focus control, a focus PWM (Pulse Width Modulation) signal for controlling the driving of the actuator 4 along the rotational axial direction is generated in the CD servo controller 21. This focus PWM signal is a digital signal (continuous pulse).

The focus PWM signal is inputted into the PWM signal smoothing filter 7 from the CD servo controller 21 and undergoes smoothing, namely, the focus PWM signal is converted into a control voltage (control signal), and it is then inputted into the driver 6. Then, based on such control voltage, the driver 6 applies the focus signal (predetermined voltage) to the actuator 4 to drive the actuator 4 in the rotational axial direction (focus direction).

In this case, the CD servo controller 21 adjusts the pulse width (duty ratio) of the focus PWM signal so that the level of the focus error signal becomes zero (i.e., the level is reduced as much as possible), and reverses the code of the focus PWM signal (pulse/minus sign). In this way, the objective lens of the optical pick-up 3 is positioned at the focus position. Namely, the focus servo is operated.

Further, during tracking control, a tracking PWM signal for controlling the driving of the actuator 4 along the radial direction is generated in the CD servo controller 21. This tracking PWM signal is also a digital signal (continuous pulse).

The tracking PWM signal is inputted into the PWM signal smoothing filter 7 from the CD servo controller 21 and undergoes smoothing, namely, the tracking PWM signal is converted into a control voltage (control signal), and it is then inputted into the driver 6. Then, based on such control voltage, the driver 6 applies the tracking signal (predetermined voltage) to the actuator 4 to drive the actuator 4 in the radial direction (tracking direction).

In this case, the CD servo controller 21 adjusts the pulse width (duty ratio) of the tracking PWM signal so that the level of the tracking error signal becomes zero (namely, the level is reduced as much as possible), and reverses the code of the tracking PWM signal (pulse/minus sign). In this way, the objective lens of the optical pick-up 3 is being positioned at the center of the track (Pre-groove). Namely, the tracking servo is operated.

Further, during the sled control, a sled PWM signal for controlling the driving of the sled motor 5 is generated in the CD servo controller 21. This sled PWM signal is also a digital signal (continuous pulse).

The sled PWM signal is inputted into the PWM signal smoothing filter 7 from the CD servo controller 21 and undergoes smoothing, namely, the sled PWM signal is converted into a control voltage (control signal), and it is then inputted into the driver 6. Then, based on such control voltage, the driver 6 applies the sled signal (predetermined voltage) to the sled motor 5 to rotationally drive the sled motor 5.

In this case, the CD servo controller 21 adjusts the pulse width (duty ratio) of the sled PWM signal so that the level of the sled error signal becomes zero (i.e., to reduce the level as much as possible), and reverses the code of the sled PWM signal (pulse/minus sign). In this way, the pick-up base of the optical pick-up 3 is positioned at the target position (proper position). Namely, the sled servo is operated.

Further, in addition to tracking control, the tracking error signal is also used, for example, to control the movement of the optical pick-up 3 toward a predetermined track (target track) of the optical disc 2 (i.e., to control track jump operations).

(4) Rotation Number Control (Rotation Speed Control)

The optical disc drive 1 is constructed so as to be able to change the rotation speed of the spindle motor 8 in multiple steps given by integral multiples of 1 such as 1×, 2×, 4×, 6×, 8× and 12× and the like. This change of the rotation speed is performed by setting the optical disc drive to a rotation speed changing mode.

For example, in recording and playing back an optical disc, the rotation speed (rotation number) of the spindle motor 8 is controlled under the condition that rotation speed is set in a predetermined rotation speed (hereinbelow, explanation is made on the assumption that the rotation speed is set in the reference rotation speed of 1×). In this case, as described above, the rotation number (rotation speed) of the spindle motor 8 is controlled so that the linear velocity becomes constant.

The methods of controlling the rotation number (rotation speed) of the motor is called as a spindle servo, and the spindle servo includes a method using a WOBBLE PWM (Pulse Width Modulation) signal, namely, a spindle servo which uses the WOBBLE signal (hereinafter, referred to as "WOBBLE servo"); a method using an FG PWM signal, namely, a spindle servo which uses an FG signal (hereinafter, referred to as "FG servo"); and a method using an EFM PWM signal, namely, a spindle servo which uses the EFM signal (hereinafter, referred to as "EFM servo"). These will be described below in the order mentioned above.

The WOBBLE PWM signal is a signal for controlling the spindle motor, and it is generated by the WOBBLE servo controller 22. The WOBBLE PWM signal is a digital signal (continuous pulse) having a level of 0–5 V.

This WOBBLE PWM signal is inputted into the PWM signal smoothing filter 12 from the WOBBLE servo controller 22 and undergoes smoothing, namely, the WOBBLE PWM signal is converted into a control voltage (control signal), and it is then inputted into the driver 11. Then, based on such control voltage, the driver 11 rotationally drives the spindle motor 8.

In this case, the WOBBLE servo controller 22 adjusts the pulse width (duty ratio) of the WOBBLE PWM signal so that the frequency (cycle) of the WOBBLE signal becomes the target value (e.g., 22.05 kHz at the reference rotation speed (1×)). In this way, the spindle servo is operated so as to set the rotation number (rotation speed) of the spindle motor 8 at a target value (a first target rotation number or a second target rotation number described later).

The FG PWM signal is a signal for controlling the spindle motor, and it is generated by the control means 13. The FG PWM signal is a digital signal having a level of 0–5 V (continuous pulse).

This FG PWM signal is inputted into the PWM signal smoothing filter 12 from the control means 13 and undergoes smoothing, namely, the FG PWM signal is converted into a control voltage (control signal), and it is then inputted into the driver 11. Then, based on such control voltage, the driver 11 rotationally drives the spindle motor 8.

On the other hand, a FG (Frequency Generator) signal corresponding to the rotation number (rotation speed) of the spindle motor 8 is outputted from the Hall element 9. This FG signal is digitized by the FG signal digitization circuit 23 and such a digitized signal is then inputted into a frequency measurement (cycle measurement) section 132 of the control means 13.

In the frequency measurement section 132 of the control means 13, the frequency (cycle) of the FG signal is measured based on the clock signal from the clock 32. Then, the control means 13 adjusts the pulse width (duty ratio) of the FG PWM signal so that the frequency (cycle) of the FG signal becomes the target value. In this way, the spindle servo is operated to set the rotation number (rotation speed) of the spindle motor 8 at the target rotation number.

The frequency of the FG signal is proportional to the rotation number of the spindle motor 8. Therefore, when the rotation speed is set at 6×, the frequency of the FG signal is 6 times of the frequency at 1×.

The EFM PWM signal is a signal for controlling the spindle motor, and it is generated by the CD servo controller 21 as described above. The EFM PWM signal is a digital signal having a level of 0–5 V level (continuous pulse).

This EFM PWM signal is inputted into the PWM signal smoothing filter 12 from the CD servo controller 21 and undergoes smoothing, namely, the EFM PWM signal is converted into a control voltage (control signal), and it is then inputted into the driver 11. Then, based on such control voltage, the driver 11 rotationally drives the spindle motor 8.

In this case, the CD servo controller 21 adjusts the pulse width (duty ratio) of the EFM signal so that the EFM signal, that is a period of a predetermined pulse selected from the 3T–11T period pulses becomes the target value at any portions on the optical disc. In this way, the spindle servo is operated to set the rotation number (rotation speed) of the spindle motor 8 at the target rotation number.

In the meantime, as described above, the rotation number of the optical disc differs between the case where the optical pick-up is in the inner region and the case where the optical pick-up is in the outer region in order to make the linear velocity constants. For example, the former case is faster than the later case for 2.5 times at the maximum. Therefore, when deciding the target rotation number in performing the spindle servo, information concerning the position of the optical pick-up 3 in the radial direction of the optical disc in addition to the current rotation speed are taken into account.

The information concerning the position of the optical pick-up 3 in the radial direction is obtained from the absolute time on the optical disc. This absolute time is obtained from ATIP or Q data of SUBCODE outputted from the ATIP decoder or CD servo controller, and then it is inputted into the control means 13 and then processed and recognized.

Next, a description is made with regard to the operation of (the initial control means of) the control means 13 when the rotation number of the optical disc 2 is increased to a first target rotation number from the state that the spindle motor 8 of the rotation driving mechanism of the optical disc drive 1 is being stopped, that is from the state that the optical disc 2 is being stopped (namely, when the disc drive is re-started).

Figure 16:
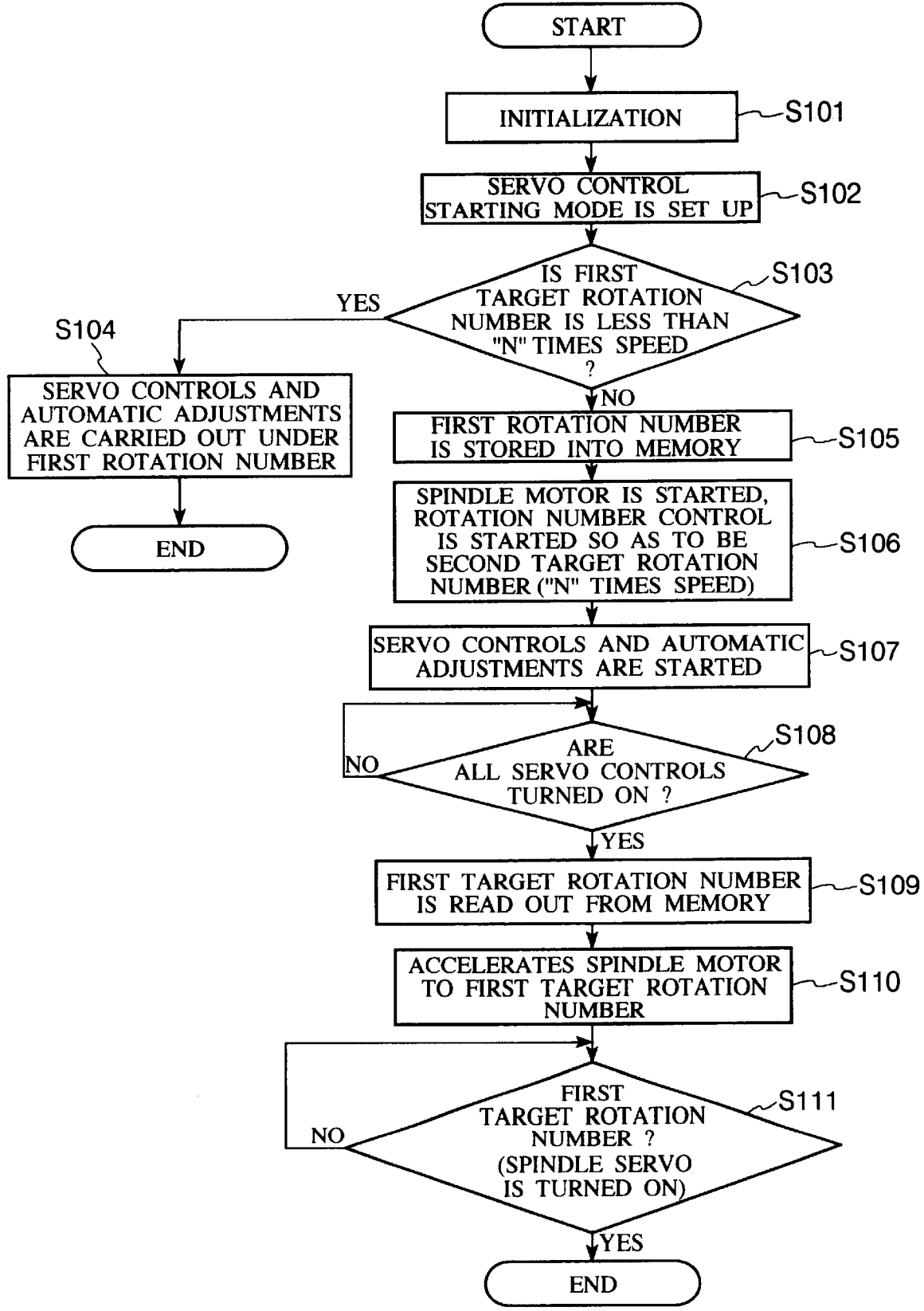
FIG. 16 is a flow chart which shows the controlled operation by the control means for increasing the rotation number of the optical disc to a first target value from the condition that the optical disc is stopped.

FIG. 16 is a flow chart which shows the operation performed by the control means 13 for increasing the rotation number of the optical disc 2 to a first target rotation number from the state that the optical disc 2 is being stopped. Hereinafter, explanation will be made based on this flow chart.

When a predetermined command is received, the program shown by the flow chart, that is a routine for rotation number control upon start of the servo controls, is executed. In this case, the first target rotation number of the optical disc 2 is set to the rotation number at the previous operation before the optical disc 2 has been stopped.

First, an initialization is carried out (Step 101). In this Step 101, a laser diode of the optical pick-up 3 is actuated (turned on), for example. Further, the CD servo controller 21, the WOBBLE servo controller 22 and a predetermined address of the memory 26 (a region to which data for the first target rotation number of the optical disc 2 is to be written) are initialized.

Next, a servo control starting mode is set up (Step 102). Then, at Step S103, a determination is made as to whether or not the presently set rotation speed of the optical disc 2, that is the first target rotation number, is equal to or less than N times rotation speed (which is set as a reference value).

In this connection, the value "N" is pre-set to an appropriate value (rotational speed) in which the various servo controls such as a focus servo, a tracking servo and a sled servo and the like described above as well as various automatic adjustments such as calibration of a signal or a cancellation of offset components described later can be performed reliably when the rotation number control such as a FG servo is being engaged so that the rotational speed of the optical disc 2 becomes the N times speed under the condition that the optical pick-up 2 is positioned at the innermost region of the optical disc 2.

In the case where it is judged that the first target rotation number is less than the N times speed at Step S103, the spindle motor 8 is started to perform the rotation number control (e.g., FG servo) so that the rotation number of the optical disc 2 becomes the first target rotation number. In this case, before the spindle servo is engaged so as to set the rotation number of the optical disc 2 to the first target rotation number (that is, the spindle servo is turned on), the various servo controls such as the focus servo control, the tracking servo control and the sled servo control as well as other various automatic adjustments for signals are carried out (Step S104).

The automatic adjustments for the signals include calibration (adjustment for amplitude of signal) and adjustment of a reference level of a signal for canceling offset components in the signal are carried out, for example. In this case, examples of the signals to be adjusted include a focus error signal, a tracking error signal, a sled error signal and a HF signal and the like.

On the other hand, in the case where it is determined at Step S103 that the first target rotation number exceeds the N times rotation number, the first target rotation number is stored in a predetermined address of the memory 26 (Step S105).

Net, the spindle motor 8 is started, and a rotation number control (e.g. FG servo) is also started so that the rotation number of the optical disc 2 becomes a second target rotation number, that is N times rotation speed (Step S106). By carrying out this rotation number control, the rotation number of the optical disc 2 is provisionally or temporarily set to the second target rotation number, that is N times rotation speed.

During the rotation number control, the various servo controls such as the focus servo control, the tracking servo control and the sled servo control as well as the various automatic adjustments described above are carried out, respectively (Step S107). These servo controls and the automatic adjustments are carried out until the rotation number of the optical disc 2 reaches the second target rotation number (that is the N times rotation speed).

According to this method, it is possible to carry out the servo controls and the automatic adjustments reliably, because the second target rotation number is less than the first target rotation number and therefore less vibration occurs even if an eccentric optical disc is loaded.

Figure 17:
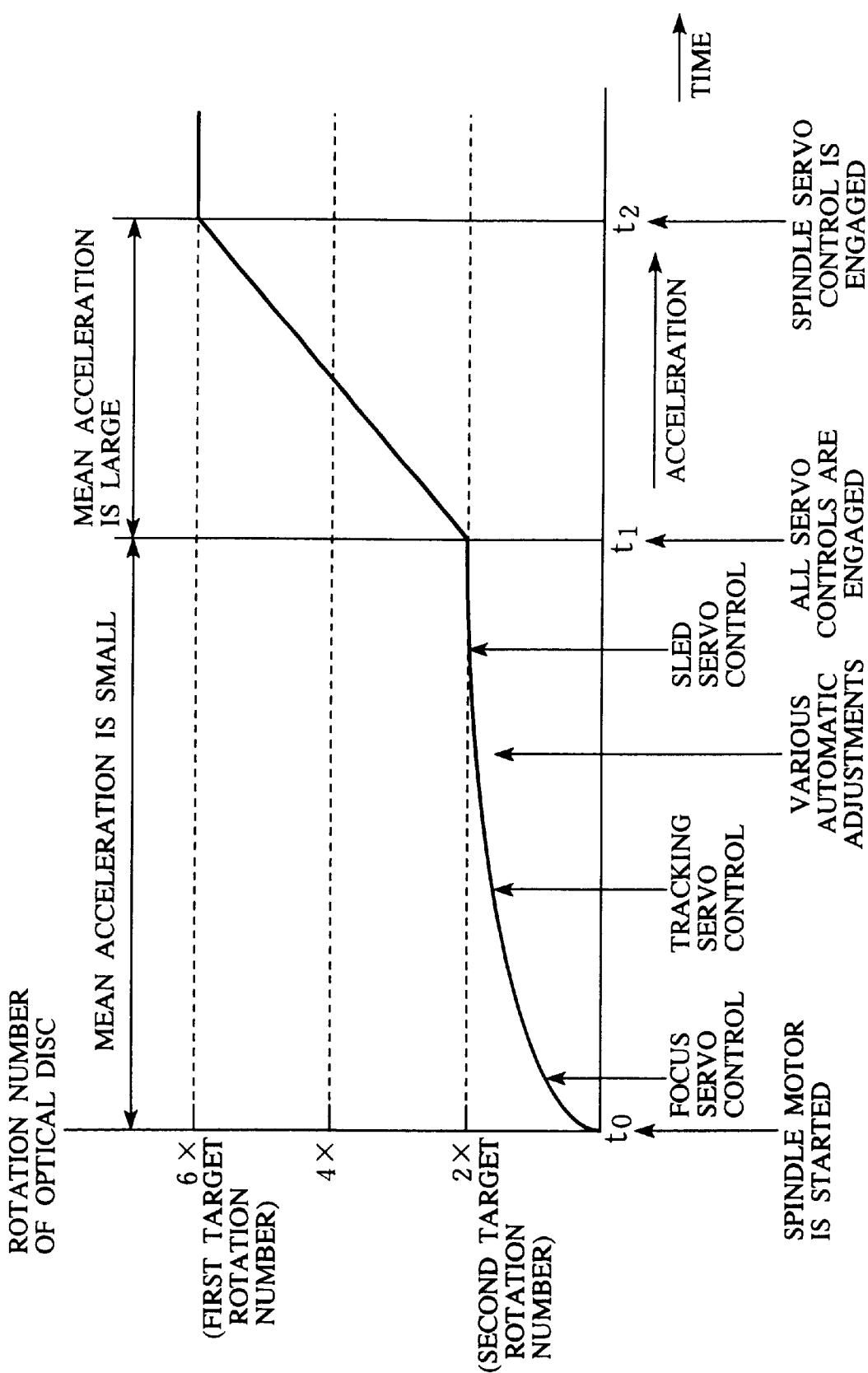
FIG. 17 is a graph which shows changes in the rotation number of the optical disc in elapse of time when the rotation number of the optical disc is increased to a first target value from the condition that the optical disc is stopped.

FIG. 17 is a graph which shows changes in the rotation number of the optical disc 2 with elapse of time when the rotation number of the optical disc is increased to the first target rotation number from the state that the optical disc 2 is being stopped. In this connection, this graph shows the example where the first target rotation number is set to a six times rotation speed (6×) and the second target rotation number is set to a two times rotation speed (2×).

As shown in the drawing, when the rotation number is to be increased to the six times rotation speed (6×) from the condition that the optical disc 2 is being stopped, the rotation number of the optical disc is provisionally and temporarily increased to the two times rotation speed (2×), and then the rotational speed of the optical disc is accelerated to the six times rotation speed (6×).

In this case, a point of time when the spindle motor 8 is started is indicated by t0, and a point of time when the rotation number of the optical disc 2 provisionally reaches the two times rotation speed (2×), that is a point of time when the spindle servo is engaged so that the rotation number of the optical disc 2 becomes the two times rotation speed (when the spindle servo is turned on) is indicated by t1, and a point of time when the spindle servo is engaged so that the rotation number of the optical disc 2 becomes the six times rotation speed (6×) is indicated by t2.

The focus servo control, the tracking servo control and the sled servo control are caused to engage or operate in this order until the rotation number of the optical disc 2 provisionally reaches the two times rotation speed after the rotation of the optical disc 2 has been started, thereby the focus servo, the tracking servo and the sled servo being operated. Further, after the tracking servo has been engaged, the various automatic adjustments described above are also carried out.

In this connection, it is to be noted that since the spindle servo control is engaged at the point of time indicated by t1, other servo controls have to be engaged before t1.

After Step S107, a judgement is made as to whether all the servo controls have been engaged (turned on) or not (Step S108). In the case where it is judged that all the servo controls have been engaged, the first target rotation number is read out from the predetermined address of the memory 26 (Step S109).

Then, the spindle motor 8 is driven to accelerate the rotation speed of the optical disc 2 so that the rotation speed of the optical disc 2 becomes the first target rotation number. In other words, the rotation number control (e.g. FG servo control) is started so that the rotation number of the optical disc 2 becomes the first target rotation number (Step S110).

As shown in FIG. 17, the mean acceleration speed between t1 and t2 is greater than the mean acceleration speed between t0 and t1.

After Step S110, a judgement is made as to whether or not the rotation number of the optical disc 2 reaches the first target rotation number, that is whether or not the spindle servo is engaged (whether or not the spindle servo is turned on or not at Step 111). In the case where it is judged that that the rotation number of the optical disc 2 has reached the first target rotation number, that is it is judged that the spindle servo has been engaged, the program is ended. This program is also ended after Step S104.

In the present invention, it is possible to set the first target rotation number so as to be higher or lower than the rotation number of the optical disc at the previous operation.

For example, when the optical disc drive is driven, information other than recorded data such as disc information (Table of Content Information) is read out in addition to the recorded data. In connection with this, in the case where the information other than the recorded data is to be read out, it is possible to set the first target rotation number so as to be lower than the rotation number of the optical disc at the previous operation. This makes it possible to suppress generation of heat by high rotation speed of the motor.

As described above, according to the present invention, it is possible to provisionally and temporarily set the rotation number of the optical disc 2 to the second rotation number when the rotation number of the optical disc 2 is increased to the first target rotation number from the stated that the rotation of the optical disc 2 is being stopped, and the various servo controls such as the focus servo control, the tracking servo control and the sled control can be carried out until the rotation number of the optical disc 2 reaches the second target rotation number.

Therefore, it becomes possible to engage the focus servo, the tracking servo and the sled servo properly and reliably even if an eccentric (unblanced) optical disc 2 is used.

Further, in the optical disc drive, since the amplitude of the signal obtained from the optical disc varies depending upon the rotation number of the optical disc 2, calibration must be carried out for the signal. However, in the case of the conventional optical disc in which the optical disc 2 is accelerated to the first target rotation number from the state that the optical disc 2 is being stopped, calibration for the signal must be carried out while the optical disc 2 is rotated at a high speed and the acceleration of the rotational speed is relatively high. Therefore, there is a case that it is not possible to adjust the amplitude of the signal into an appropriate value. In contrast with this, according to the present invention, since the calibration is carried out when the optical disc 2 is rotated at a relatively low rotational speed and the acceleration is relatively low, it is possible to adjust the amplitude of the signal into a proper value reliably.

Further, in the conventional optical disc drive, the reference level for the signal is adjusted during the optical disc 2 being rotated at a high speed and the acceleration of the optical disc 2 being relatively high, so that there is a case that the adjustment can not be carried out properly. However, in the optical disc drive of the present invention, since the adjustment is carried out when the optical disc 2 is rotated at a relatively low rotational speed and the acceleration is relatively low, it is possible to carry out the adjustment of the reference level properly and reliably.

The optical disc drive according to the present invention is not limited to a CD-R drive described above. The present invention can be applied to other various disc drives which can play back or record and playback optical discs having a pre-groove such as CD-RW, DVD-R, DVD-RAM and the like and disc drives which can only play back optical discs such as CD (compact disc), CD-ROM and the like.

Although in the foregoing the description was made with regard to the embodiments of the optical disc drive according to the present invention, the present invention is not limited to these embodiments, and it goes without saying that the structure of each component or element can be replaced with other structure having the same function.

For example, the rotation number control of the present invention described above can be applied not only to the case where the optical disc drive is re-started from the state that the rotation of the optical disc has been once stopped as described above but also to the case where an optical disc is loaded and then the optical disc drive is started (turned on).

As described above, according to the optical disc drive of the present invention, when the rotation number of the optical disc is increased to a first target rotation number, the rotation number of the optical disc is provisionally set to a second target rotation number which is lower than the first target rotation number, and the servo control of the optical pick-up such as a tracking servo, a focus servo and the like is carried out until the rotation number reaches the second target rotation number, thereby making it possible to carry out the control of the optical pick-up properly and reliably.

Therefore, even if an eccentric (unbalanced) optical disc is used, a focus servo and a tracking servo can be carried out reliably.

Further, since the adjustment of the amplitude of the obtained signal and the adjustment of the reference level of the signal are also carried out until the rotation number of the optical disc 2 reaches the second target rotation number, they can be carried out reliably.

Finally, it should be also noted that even though the optical disc drive of the present invention was described with reference to the embodiment shown in the drawings, the present invention is not limited thereto, and any additions or changes may be made without departing from the scope of the following claims.

What is claimed is:

1. An optical disc drive for playing back or recording and playing back an optical disc, comprising:

an optical disc driving mechanism for rotating an optical disc;

an optical pick-up having an objective lens which is actuated by servo operation;

signal processing means for processing signals read out from the optical disc through the optical pick-up; and control means for controlling the optical disc rotating mechanism, the optical pick-up and the signal processing means, said controlling means including initial control means for controlling the optical pick-up rotating mechanism and the optical pick-up so that, when the rotation number of the optical disc is to be increased to a first target rotation number, the rotation number of the optical disc is provisionally set to a second target rotation number which is smaller than the first target rotation number, and at least the servo operation of the optical pick-up is caused to engage until the rotation number of the optical disc reaches the second target rotation number, and when the servo operation is confirmed to be engaged, the rotation speed is then increased to the first target rotation number.

2. The optical disc drive as claimed in claim 1, wherein the initial control means is operated when the rotation number of the optical disc is to be increased to the first target rotation number from the state that the optical disc drive is turned on.

3. The optical disc drive as claimed in claim 1, wherein the initial control means is operated when the rotation number of the optical disc is to be increased to the first target rotation number by re-starting the rotation of the optical disc once after the rotation of the optical disc has been stopped.

4. The optical disc drive as claimed in claim 1, wherein the initial control means is operated only when the fist target rotation number exceeds a predetermined reference rotation number.

5. The optical disc drive as claimed in claim 1, wherein the mean acceleration of the optical disc from the second target rotation number to the first target rotation number is larger than the mean acceleration of the optical disc from the start of the optical pick-up rotating mechanism to the second target rotation number.

6. The optical disc drive as claimed in claim 1, wherein the servo operation of the optical pick-up to be controlled includes at least one of a focus servo and a tracking servo.

7. The optical disc drive as claimed in claim 1, further comprises means for automatically adjusting a predetermined signal used in the optical disc drive, wherein the adjustment of the predetermined signal is adapted to be performed until the rotation number of the optical disc reaches the second target rotation number.

8. The optical disc drive as claimed in claim 7, wherein the adjustment of the predetermined signal includes at least one of adjustment of amplitude of the signal read out from the optical disc and adjustment of a reference level for canceling offset components in the signal.

9. A method for controlling an optical disc drive for playing back or recording and playing back an optical disc, comprising the steps of:

starting rotation of an optical disc so that the rotation number of the optical disc becomes a first target rotation number;

increasing the rotation number of the optical disc provisionally to a second target rotation number which is smaller than the first target rotation number;

causing servo control of an optical pick-up to engage until the rotation number of the optical disc reaches the second rotation number; and increasing the rotation number of the optical disc from the second target rotation number to the first target rotation number.

10. The method as claimed in claim 9, wherein the method is carried out when the optical disc is started to rotate from the state that the optical disc drive is turned on.

11. The method as claimed in claim 9, wherein the method is carried out when the optical disc is re-started to rotate once after the rotation of the optical disc has been stopped.

12. The method as claimed in claim 9, further comprising the step of determining whether or not the first target rotation number exceeds a predetermined reference rotation number, and only when the first target rotation number exceeds the predetermined reference rotation number, the rotation number of the optical disc is provisionally increased to the second target rotation number.

13. The method as claimed in claim 9, wherein the mean acceleration of the optical disc from the second target rotation number to the first target rotation number is larger than the mean acceleration of the optical disc from the start of the optical pick-up rotating mechanism to the second target rotation number.

14. The method as claimed in claim 9, wherein the servo control includes at least one of a focus servo control and a tracking servo control.

15. The method as claimed in claim 9, further comprising the step of performing adjustment of a predetermined signal used in the optical disc drive until the rotation number of the optical disc reaches the second target rotation number.

16. The method as claimed in claim 15, wherein the adjustment of the predetermined signal includes at least one of adjustment of amplitude of the signal read out from the optical disc and adjustment of a reference level for canceling offset components in the signal.

* * * * *